United States Patent
Cheng et al.

(10) Patent No.: US 11,711,250 B2
(45) Date of Patent: Jul. 25, 2023

(54) MULTI-NUMEROLOGY FRAME STRUCTURE FOR NR OPERATION IN MM-WAVE FREQUENCY BANDS

(71) Applicant: Telefonaktiebolaget LM Ericsson (publ), Stockholm (SE)

(72) Inventors: Jung-Fu Cheng, Fremont, CA (US); Yuhang Liu, Lund (SE); Peter Alriksson, Hörby (SE); Stephen Grant, Pleasanton, CA (US); Tai Do, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/910,141

(22) PCT Filed: Mar. 12, 2021

(86) PCT No.: PCT/SE2021/050217
§ 371 (c)(1),
(2) Date: Sep. 8, 2022

(87) PCT Pub. No.: WO2021/183035
PCT Pub. Date: Sep. 16, 2021

(65) Prior Publication Data
US 2023/0101410 A1 Mar. 30, 2023

Related U.S. Application Data

(60) Provisional application No. 62/989,294, filed on Mar. 13, 2020.

(51) Int. Cl.
*H04L 27/26* (2006.01)
*H04L 5/00* (2006.01)

(52) U.S. Cl.
CPC ...... *H04L 27/26025* (2021.01); *H04L 5/0007* (2013.01); *H04L 5/0044* (2013.01); *H04L 5/0053* (2013.01)

(58) Field of Classification Search
CPC ............. H04L 27/26025; H04W 72/0457
See application file for complete search history.

(56) References Cited

U.S. PATENT DOCUMENTS

2020/0221428 A1* 7/2020 Moon .................. H04L 5/0023

FOREIGN PATENT DOCUMENTS

| EP | 3301848 A2 | 4/2018 | |
| EP | 3459315 B1 * | 8/2019 | ......... G01N 21/8806 |

(Continued)

OTHER PUBLICATIONS

International Search Report and Written Opinion dated Jun. 22, 2021 for International Application No. PCT/SE2021/050217 filed Mar. 12, 2021; consisting of 13 pages.

(Continued)

*Primary Examiner* — Kevin Kim
(74) *Attorney, Agent, or Firm* — Christopher & Weisberg, P.A.

(57) ABSTRACT

A method, system and apparatus are disclosed. According to one or more embodiments, a network node configured to communicate with a wireless device is provided. The network node includes processing circuitry configured to dynamically indicate a mixed numerology to the wireless device for implementation where the mixed numerology corresponds to a first numerology for a data channel and a second numerology for a control channel, the first numerology being different from the second numerology.

19 Claims, 17 Drawing Sheets

(56) References Cited

FOREIGN PATENT DOCUMENTS

WO     2018171413 A1    9/2018
WO     2018231971 A1    12/2018

OTHER PUBLICATIONS

3GPP TS 38.211 V16.2.0; 3rd Generation Partnership Project; Technical Specification Group Radio Access Network; NR; Physical channels and modulation (Release 16); Jun. 2020; consisting of 131 pages.
3GPP TS 38.104 V16.2.0; 3rd Generation Partnership Project; Technical Specification Group Radio Access Network; NR; Base Station (BS) radio transmission and reception (Release 16); Dec. 2019; consisting of 239 pages.
3GPP TS 38.213 V16.2.0; 3rd Generation Partnership Project; Technical Specification Group Radio Access Network; NR; Physical layer procedures for control (Release 16); Jun. 2020; consisting of 176 pages.
Luo, Jian, et al.;Title: Preliminary radio interface concepts for mm-wave mobile communications; mmMagic 5G PPP Public Private Partnership; Project Name: Millimetre-Wave Based Mobile Radio Access Network for Fifth Generation Integrated Communications (mmMAGIC); Jul. 1, 2015; consisting of 232 pages.
3GPP TSG RAN Meeting #86 RP-193259 (revision of RP-193258); Title: New SID: Study on supporting NR from 52.6GHz to 71GHz; Source: Intel Corporation; Document for: Approval; Agenda Item: 9.1.1; Date and Location: Dec. 9-12, 2019, Sitges, Spain; consisting of 4 pages.

\* cited by examiner

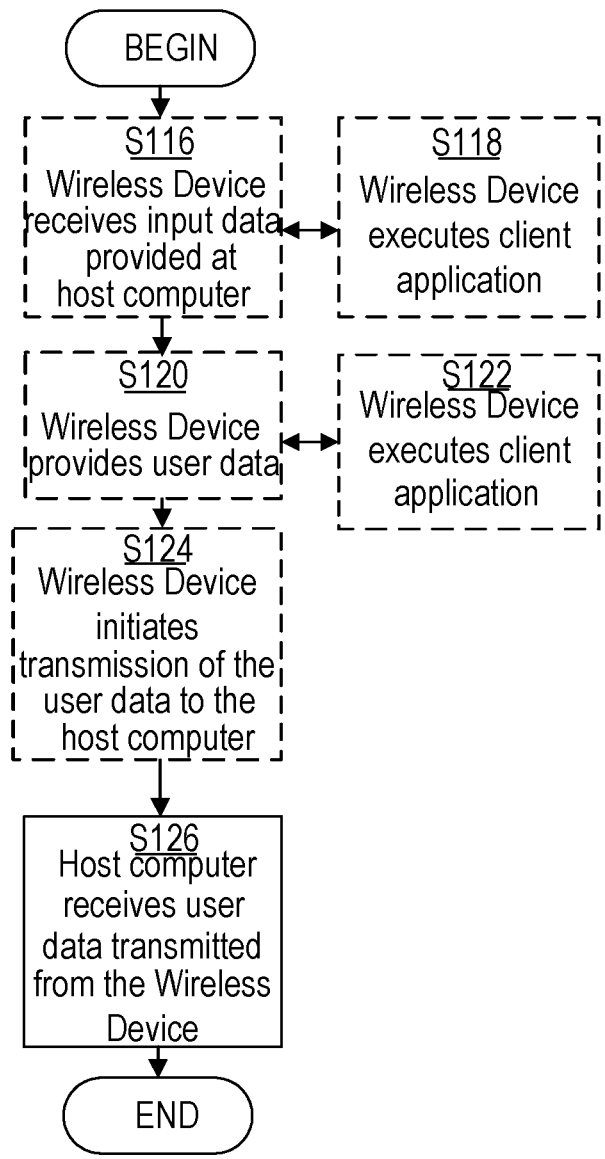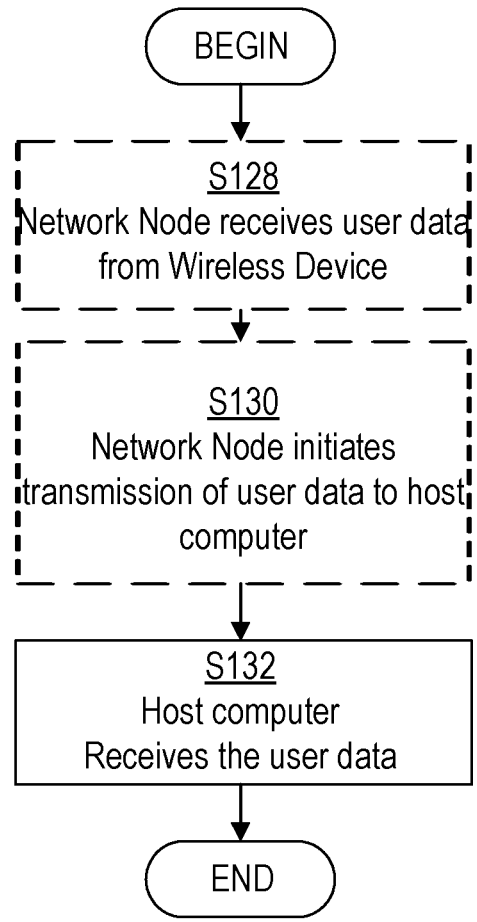
FIG. 6
FIG. 7

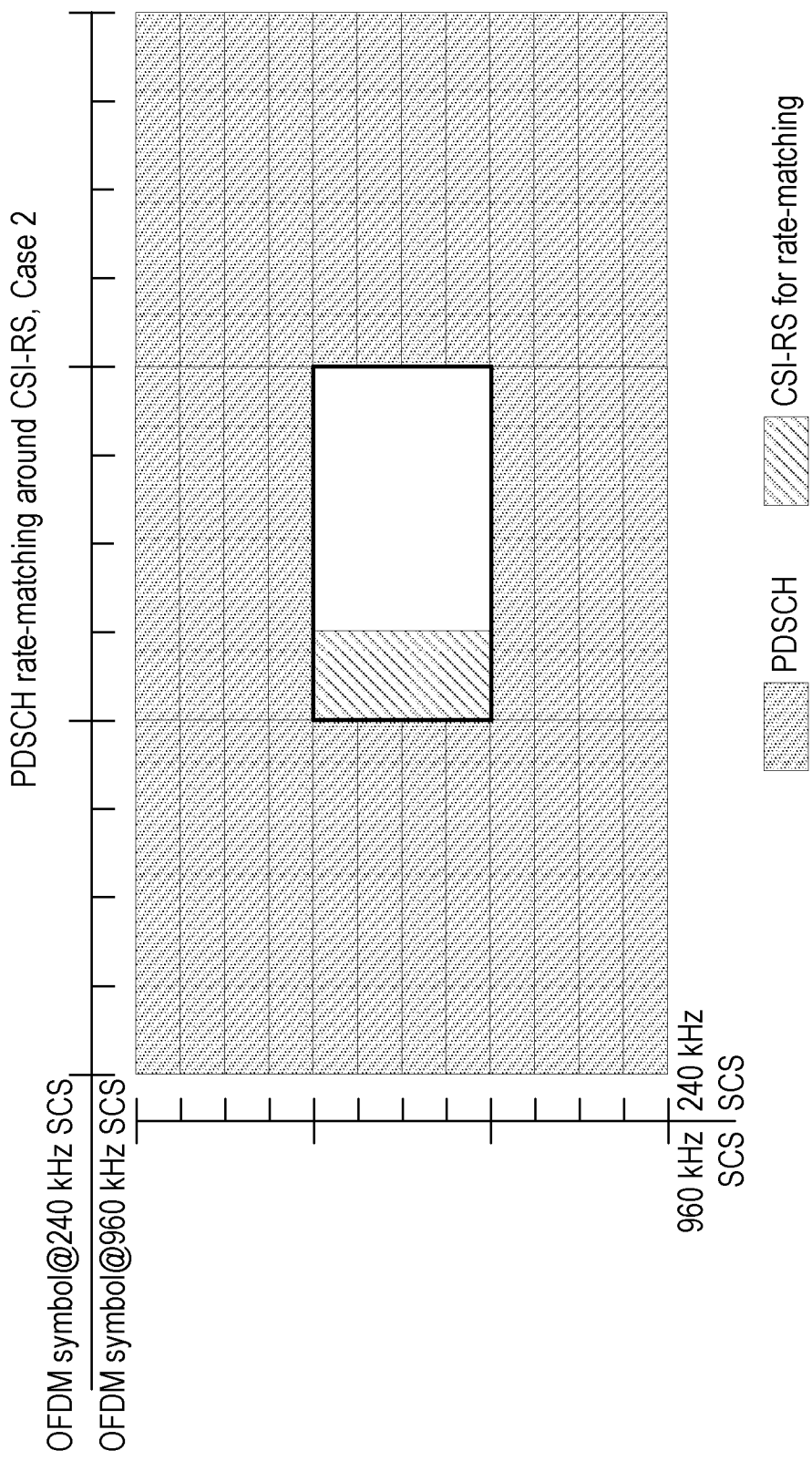

MULTI-NUMEROLOGY FRAME STRUCTURE FOR NR OPERATION IN MM-WAVE FREQUENCY BANDS

CROSS-REFERENCE TO RELATED APPLICATIONS

This application is a Submission Under 35 U.S.C. § 371 for U.S. National Stage Patent Application of International Application No.: PCT/SE2021/050217, filed Mar. 12, 2021 entitled "MULTI-NUMEROLOGY FRAME STRUCTURE FOR NR OPERATION IN MM-WAVE FREQUENCY BANDS," which claims priority to U. S. Provisional Application No.: 62/989,294, filed Mar. 13, 2020, entitled "MULTI-NUMEROLOGY FRAME STRUCTURE FOR NR OPERATION IN MM-WAVE FREQUENCY BANDS," the entireties of both of which are incorporated herein by reference.

FIELD

The present disclosure relates to wireless communications, and in particular, to configuring physical channels within a bandwidth part (BWP) with multiple numerologies.

BACKGROUND

New Radio (NR) Operation in Millimeter (Mm)-Wave Bands

Mobile broadband continues to drive the demands for higher overall traffic capacity and higher achievable end-user data rates in the wireless access network. Several scenarios in future networks may require data rates of up to 10 Gbps in local areas. These demands for very high system capacity and very high end-user date rates may be met by networks with distances between access nodes ranging from a few meters in indoor deployments up to roughly 50 m in outdoor deployments, i.e., with an infra-structure density considerably higher than the most dense networks currently in existence. The wide transmission bandwidths that may be needed to provide data rates up to 10 Gbps and above can likely only be obtained from spectrum allocations in the millimeter-wave band. High-gain beamforming, typically realized with array antennas, can be used to mitigate the increased pathloss at higher frequencies of the millimeter-wave band. Such networks may be referred to as $3^{rd}$ Generation Partnership Project (3GPP) New Radio (NR) or $5^{th}$ Generation (5G) systems herein.

NR supports a diverse set of use cases and a diverse set of deployment scenarios. The latter includes deployment at both low frequencies (100 s of MHz), and very high frequencies (mm waves in the tens of GHz). Two operational frequency ranges are defined in NR Third Generation Partnership Project (3GPP) Rel-15: Frequency Range 1 (FR1) from 410 MHz to 7125 MHz and FR2 from 24.250 GHz to 52.6 GHz. 3GPP Radio Access Network (RAN) is working on a study item for NR 3GPP Rel-17 for supporting NR operation from 52.6 GHz to 71 GHz, which includes the following objectives:

Study of changes to NR using existing Downlink (DL)/ Uplink (UL) NR waveform to support operation between 52.6 GHz and 71 GHz Study of applicable numerology including subcarrier spacing, channel Bandwidth (BW) (including maximum BW), and their impact to FR2 physical layer design to support system functionality considering practical RF impairments [RAN1, RAN4].

Identify potential critical problems to physical signal/ channels, if any [RAN1].

Study of channel access mechanisms, considering potential interference to/from other nodes, assuming beam-based operation, in order to comply with the regulatory requirements applicable to unlicensed spectrum for frequencies between 52.6 GHz and 71 GHz [RAN1].

Note: It is clarified that potential interference impact, if identified, may require interference mitigation solutions as part of channel access mechanism.

NR Frame Structure

Similar to Long Term Evolution (LTE, also referred to as $4^{th}$, Generation (4G)), NR uses OFDM (Orthogonal Frequency Division Multiplexing) in the downlink (i.e., from a network node (e.g., gNB, eNB, or base station) to a user equipment (UE)/wireless device). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15 \times 2^{\wedge}\mu)$ kHz where $\mu \in (0,1,2,3,4)$. $\Delta f=15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f=(15 \times 2^{\wedge}\mu)$ kHz is $\frac{1}{2}^{\wedge}\mu$ ms. There is only one slot per subframe for $\Delta f=15$ kHz and a slot consists of 14 OFDM symbols.

Downlink transmissions are dynamically scheduled, i.e., in each slot the network node transmits downlink control information (DCI) about which wireless device data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A wireless device first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including Synchronization Signal Block (SSB), Channel State Information-Reference Signal (CSI-RS), etc.

Uplink data transmissions, carried on Physical Uplink Shared Channel (PUSCH), are also dynamically scheduled by the network node by transmitting a DCI., the DCI (which is transmitted in the DL region) always indicates a scheduling offset so that the PUSCH is transmitted in a slot in the UL region.

Type-1 Frequency Domain Resource Allocation

In resource allocation of type 1, the resource block assignment information indicates to a scheduled wireless device a set of contiguously allocated non-interleaved or interleaved virtual resource blocks within the active bandwidth part of size $N_{BWP}^{size}$ PRBs except for the case when DCI format 1_0 is decoded in any common search space in which case the size of CORESET 0 may be used if CORESET 0 is configured for the cell and the size of initial DL bandwidth part may be used if CORESET 0 is not configured for the cell. A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by if $(L_{RBs}-1) \le [N_{BWP}^{size}/2]$ then $RIV = N_{BWP}^{size}(L_{RBs}-1) + RB_{start}$ else $RIV = N_{BWP}^{size}(N_{BWP}^{size} - L_{RBs} + 1) + (N_{BWP}^{size} - 1 - RB_{start})$ where $L_{RBs} \ge 1$ and shall not exceed $N_{BWP}^{size} - RB_{start}$.

Subcarrier Spacing

To support network deployment in a wide-range of frequency bands for variety of application scenarios, NR supports a flexible numerology with a range of subcarrier spacings, based on a scaling of a baseline subcarrier spacing of 15 kHz.

First of all, subcarrier spacing for SSB in a carrier is specified by the synchronization raster per frequency band as defined in wireless communication standards such as in 3GPP TS 38.104, v16.2.0, Table 5.4.3.3-1 and Table 5.4.3.3-2. After the acquisition of SSB, the subCarrierSpacingCommon field in Master Information Block (MIB) indicates the subcarrier spacing for System Information Block type 1 (SIB1), Msg.⅔ for initial access, paging and broadcast SI-messages. SIB1 further indicates the subcarrier spacing for channel and reference signals in the initial UL Bandwidth Part (BWP), while for the initial DL BWP the subcarrier spacing should be the same value as the field subCarrierSpacingCommon in MIB. For frequency range 1 (FR1) operation, the subcarrier spacing can be set to either 15 or 30 kHz. For frequency range 2 (FR2) operation, the subcarrier spacing can be set to either 60 or 120 kHz. Besides the initial DL/UL BWP, wireless devices may be further configured with other BWPs for each one of which subcarrier spacing is specified as part of the BWP configuration.

In general, in NR, all channels and reference signals in a BWP use the subcarrier spacing specified by the BWP configuration unless explicitly configured elsewhere. The system may only change the subcarrier spacing of signals or channels only via changing the active BWP. As described in wireless communication standards such as in NR 3GPP Rel-15 and 3GPP Rel-16, the exceptional channels and reference signal that adopt different subcarrier spacing than the one for the associated BWP are SSB in DL and Physical Random Access Channel (PRACH) in the UL. Synchronization Signal Block (SSB) may adopt a subcarrier spacing that is different for the other channel and reference signal in the initial DL BWP. The subcarrier spacing for PRACH may be specified separately by the field RACH-ConfigCommon:: msg1-SubcarrierSpacing in the initial UL BWP configuration.

Technical Challenges for NR Operation in Mm-Wave Frequency

Frequencies above 52.6 GHz are faced with more difficult challenges when compared to lower frequencies where some of these challenges may include one or more of higher phase noise, larger propagation loss due to high atmospheric absorption, lower power amplifier efficiency, and strong power spectral density regulatory requirements in unlicensed bands, compared to lower frequency bands.

Phase noise in a radio equipment comes at least in part from the time domain instability of the local oscillator. As a result of phase noise, the received signal suffers from random time varying phase errors. Generally, the phase-noise variance grows with the square of carrier frequency while it is inversely proportional to the power consumption. In the high frequency range above 52.6 GHz, phase noise becomes one of the design challenges especially for multi-carrier waveform such as OFDM with higher order modulation.

Further, as the operating frequency of wireless networks increases and moves to milli-meter wave territory, data transmission between nodes suffers from high propagation loss, which is proportional to the square of the carrier frequency. Moreover, milli-meter wave signal may also suffer from high oxygen absorption, high penetration loss and a variety of blockage problems. On the other hand, with the wavelength as small as less than a centi-meter, it becomes possible to pack a large amount (tens, hundreds or even thousands) of antenna elements into a single antenna array with a compact formfactor, which can be widely adopted in network equipment/network nodes and user devices/wireless device. Such antenna arrays/panels can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands.

3GPP RAN is conducting a study to investigate the feasibility of re-using the existing OFDM and DFT-s-OFDM waveforms, which are used in NR for the frequency ranges of FR1 and FR2, for the frequency range above 52.6 GHz. Extending the existing NR waveforms to the higher frequency bands can leverage the existing physical channel and signal design and the signaling mechanism in NR, and reduce the standardization and implementation cost significantly. It can also help network equipment and user devices to relieve from the technical complexity of supporting multiple waveforms. However, there are various drawbacks related to re-use of existing OFDM and DFT-s-OFDM waveforms but at higher frequencies.

SUMMARY

Some embodiments advantageously provide methods, systems, and apparatuses for configuring physical channels within a bandwidth part (BWP) with multiple numerologies.

In one or more embodiments, a mixed numerology frame structure is provided for wireless communications such as wireless communications based at least in part on NR operation in mm-wave frequency bands. In one or more embodiments, existing OFDM and DFT-s-OFDM waveforms are reused but with modification(s)/enhancement(s) such as to enable using different subcarrier spacing for different physical channels and signals within a BWP. For control channels (e.g., SSB, PDCCH, PUCCH, etc.) which may not use high order modulation, smaller subcarrier spacings can be used/implemented to improve the link budget and achieve better cell coverage. For data channels (e.g., PDSCH and PUSCH) that could potentially use high order modulation, larger subcarrier spacings can be applied to improve link performance in presence of large phase noise. In one or more embodiments, dynamic subcarrier spacing settings are configured such as for the same physical channel. For instance, data channels using the 16QAM or even higher order modulations use the largest supported subcarrier spacing agreed to between the network node and the wireless device, and data channels using the QPSK modulation can use subcarrier spacings ranging from those used for the control channel to the largest supported subcarrier spacing based on at least the allocated bandwidth and targeted data rates.

Usage of multi-numerology such as, for example, for different physical channels and signals within a BWP, also provides an approach to reduce scheduling granularity and signaling overhead. For example, in one or more embodiments, a relatively small subcarrier spacing can be specified as the basic numerology which is used to determine a slot duration that serves as the basic scheduling granularity where the existing scheduling and signaling features in NR can be re-used to a large extent. Resource allocation in time domain for physical channels with larger numerologies can be derived given the oversampling factor of the channels with relative to the basic numerology.

According to one aspect of the disclosure, a network node configured to communicate with a wireless device is provided. The network node includes processing circuitry configured to dynamically indicate a mixed numerology to the wireless device for implementation where the mixed numerology corresponds to a first numerology for a data channel and a second numerology for a control channel, and where the first numerology is different from the second numerology.

According to one or more embodiments, the processing circuitry is further configured to indicate a preconfigured subcarrier spacing for a bandwidth part, BWP, in a carrier where the dynamically indicated mixed numerology configured to change a subcarrier spacing for the data channel from the preconfigured subcarrier spacing to a first subcarrier spacing associated with the first numerology, and add at least one demodulation reference signal, DMRS, symbol to the data channel to densify a DMRS allocation that is based on the preconfigured subcarrier spacing. According to one or more embodiments, the additional at least one DMRS symbol is distributed throughout the data channel in a time domain. According to one or more embodiments, the additional at least one DMRS symbol is front-loaded next to another DMRS symbol of the DMRS allocation.

According to one or more embodiments, the data channel and control channel are allocated within a bandwidth part, BWP, that is defined by a plurality of subcarrier spacings where the plurality of subcarrier spacing includes a first subcarrier spacing associated with the first numerology and a second subcarrier spacing associated with the second numerology. According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing. According to one or more embodiments, the plurality of subcarrier spacings are based on a largest subcarrier spacing of the plurality of subcarrier spacings.

According to one or more embodiments, a resource block start position and a size of the BWP are based at least in part on the largest subcarrier spacing of the plurality of subcarrier spacings. According to one or more embodiments, the first numerology for the data channel is associated with a larger subcarrier spacing than a subcarrier spacing associated with the second numerology. According to one or more embodiments, the subcarrier spacing associated with the second numerology corresponds to a subcarrier spacing preconfigured for a bandwidth part, BWP, in which the data channel and control channel are transmitted. According to one or more embodiments, the processing circuitry is further configured to indicate the first numerology at least in part by signaling of an expansion factor where the expansion factor configured to change a subcarrier spacing from a preconfigured subcarrier spacing for a bandwidth part, BWP, to a first subcarrier spacing associated with the first numerology using the expansion factor.

According to one or more embodiments, the signaling corresponds to one of semi-static radio resource control, RRC, signaling, semi-persistent medium access control, MAC, control element, CE, signaling and downlink control information, DCI, signaling. According to one or more embodiments, the DCI signaling includes a subcarrier spacing section field and a frequency domain resource allocation field that are jointly encoded as a bit field having a predefined bit size. According to one or more embodiments, a subset of most significant bits in the bit field are configured to indicate the first subcarrier spacing.

According to one or more embodiments, the processing circuitry is further configured to rate match the data channel to a channel state information reference signal, CSI-RS, associated with a different subcarrier spacing than the first subcarrier spacing. According to one or more embodiments, the processing circuitry is further configured to multiplex a plurality of sounding reference signals, SRSs, received from a plurality of wireless devices where the plurality of SRSs are associated with a plurality of subcarrier spacings including at least a first subcarrier spacing associated with the first numerology.

According to another aspect of the disclosure, a wireless device configured to communicate with a network node is provided. The network node includes processing circuitry configured to receive a dynamically indication of a mixed numerology where the mixed numerology corresponds to a first numerology for a data channel and a second numerology for a control channel and where the first numerology is different from the second numerology. The processing circuitry is further configured to cause implementation of the mixed numerology.

According to one or more embodiments, the processing circuitry is further configured to receive an indication for a preconfigured subcarrier spacing for a bandwidth part, BWP, in carrier where the dynamically indicated mixed numerology is configured to change a subcarrier spacing for the data channel from the preconfigured subcarrier spacing to a first subcarrier spacing associated with the first numerology. The data channel includes at least one added demodulation reference signal, DMRS, symbol for densifying a DMRS allocation that is based on the preconfigured subcarrier spacing. According to one or more embodiments, the at least one added DMRS symbol is distributed throughout the data channel in a time domain. According to one or more embodiments, the at least one added DMRS symbol is front-loaded next to another DMRS symbol of the DMRS allocation.

According to one or more embodiments, the data channel and control channel are allocated within a bandwidth part, BWP, that is defined by a plurality of subcarrier spacings where the plurality of subcarrier spacing includes a first subcarrier spacing associated with the first numerology and a second subcarrier spacing associated with the second numerology. According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing. According to one or more embodiments, the plurality of subcarrier spacings are based on a largest subcarrier spacing of the plurality of subcarrier spacings.

According to one or more embodiments, a resource block start position and a size of the BWP are based at least in part on the largest subcarrier spacing of the plurality of subcarrier spacings. According to one or more embodiments, the first numerology for the data channel is associated with a larger subcarrier spacing than a subcarrier spacing associated with the second numerology. According to one or more embodiments, the subcarrier spacing associated with the second numerology corresponds to a subcarrier spacing preconfigured for a bandwidth part, BWP, in which the data channel and control channel are received. According to one or more embodiments, the processing circuitry is further configured to receive an indication of the first numerology at least in part by receiving signaling of an expansion factor where the expansion factor is configured to change a subcarrier spacing from a preconfigured subcarrier spacing for a bandwidth part, BWP, to a first subcarrier spacing associated with the first numerology using the expansion factor.

According to one or more embodiments, the signaling corresponds to one of semi-static radio resource control, RRC, signaling, semi-persistent medium access control, MAC, control element, CE, signaling and downlink control information, DCI, signaling. According to one or more embodiments, the DCI signaling includes a subcarrier spacing section field and a frequency domain resource allocation field that are jointly encoded as a bit field having a predefined bit size. According to one or more embodiments, a subset of most significant bits in the bit field are configured to indicate the first subcarrier spacing.

According to one or more embodiments, the processing circuitry is further configured to receive a transmission including the data channel rate matched to a channel state information reference signal, CSI-RS, associated with a different subcarrier spacing than the first subcarrier spacing. According to one or more embodiments, the processing circuitry is further configured to transmit a first sounding reference signal, SRS, in accordance with the mixed numerology where the first SRS is part of a plurality of SRSs associated with a plurality of wireless device where the plurality of SRSs are associated with a plurality of subcarrier spacings including at least a first subcarrier spacing associated with the first numerology and being configured to be multiplexed for processing.

According to another aspect of the disclosure, a method implemented by a network node that is configured to communicate with a wireless device is provided. A mixed numerology is dynamically indicated to the wireless device for implementation where the mixed numerology corresponds to a first numerology for a data channel and a second numerology for a control channel, and where the first numerology is different from the second numerology.

According to one or more embodiments, a preconfigured subcarrier spacing for a bandwidth part, BWP, in a carrier is indicated where the dynamically indicated mixed numerology is configured to change a subcarrier spacing for the data channel from the preconfigured subcarrier spacing to a first subcarrier spacing associated with the first numerology. At least one demodulation reference signal, DMRS, symbol is added to the data channel to densify a DMRS allocation that is based on the preconfigured subcarrier spacing. According to one or more embodiments, the additional at least one DMRS symbol is distributed throughout the data channel in a time domain. According to one or more embodiments, the additional at least one DMRS symbol is front-loaded next to another DMRS symbol of the DMRS allocation. According to one or more embodiments, the data channel and control channel are allocated within a bandwidth part, BWP, that is defined by a plurality of subcarrier spacings where the plurality of subcarrier spacing include a first subcarrier spacing associated with the first numerology and a second subcarrier spacing associated with the second numerology.

According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing. According to one or more embodiments, the plurality of subcarrier spacings are based on a largest subcarrier spacing of the plurality of subcarrier spacings. According to one or more embodiments, a resource block start position and a size of the BWP are based at least in part on the largest subcarrier spacing of the plurality of subcarrier spacings.

According to one or more embodiments, the first numerology for the data channel is associated with a larger subcarrier spacing than a subcarrier spacing associated with the second numerology. According to one or more embodiments, the subcarrier spacing associated with the second numerology corresponds to a subcarrier spacing preconfigured for a bandwidth part, BWP, in which the data channel and control channel are transmitted. According to one or more embodiments, the first numerology is indicated at least in part by signaling of an expansion factor where the expansion factor is configured to change a subcarrier spacing from a preconfigured subcarrier spacing for a bandwidth part, BWP, to a first subcarrier spacing associated with the first numerology using the expansion factor. According to one or more embodiments, the signaling corresponds to one of semi-static radio resource control, RRC, signaling, semi-persistent medium access control, MAC, control element, CE, signaling and downlink control information, DCI, signaling.

According to one or more embodiments, the DCI signaling includes a subcarrier spacing section field and a frequency domain resource allocation field that are jointly encoded as a bit field having a predefined bit size. According to one or more embodiments, a subset of most significant bits in the bit field are configured to indicate the first subcarrier spacing. According to one or more embodiments, the data channel is rate matched to a channel state information reference signal, CSI-RS, associated with a different subcarrier spacing than the first subcarrier spacing. According to one or more embodiments, a plurality of sounding reference signals, SRSs, received from a plurality of wireless devices are multiplexed where the plurality of SRSs are associated with a plurality of subcarrier spacings including at least a first subcarrier spacing associated with the first numerology.

According to another aspect of the disclosure, a method implemented by a wireless device configured to communicate with a network node is provided. A dynamic indication of a mixed numerology is received where the mixed numerology corresponds to a first numerology for a data channel and a second numerology for a control channel and where the first numerology is different from the second numerology. Implementation of the mixed numerology is caused.

According to one or more embodiments, an indication for a preconfigured subcarrier spacing for a bandwidth part, BWP, in carrier is received where the dynamically indicated mixed numerology is configured to change a subcarrier spacing for the data channel from the preconfigured subcarrier spacing to a first subcarrier spacing associated with the first numerology. The data channel includes at least one added demodulation reference signal, DMRS, symbol for densifying a DMRS allocation that is based on the preconfigured subcarrier spacing. According to one or more embodiments, the at least one added DMRS symbol is distributed throughout the data channel in a time domain. According to one or more embodiments, the at least one added DMRS symbol is front-loaded next to another DMRS symbol of the DMRS allocation.

According to one or more embodiments, the data channel and control channel are allocated within a bandwidth part, BWP, that is defined by a plurality of subcarrier spacings where the plurality of subcarrier spacing includes a first subcarrier spacing associated with the first numerology and a second subcarrier spacing associated with the second numerology. According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing.

According to one or more embodiments, the plurality of subcarrier spacings are based on a largest subcarrier spacing of the plurality of subcarrier spacings. According to one or more embodiments, a resource block start position and a size of the BWP are based at least in part on the largest subcarrier spacing of the plurality of subcarrier spacings. According to one or more embodiments, the first numerology for the data channel is associated with a larger subcarrier spacing than a subcarrier spacing associated with the second numerology.

According to one or more embodiments, the subcarrier spacing associated with the second numerology corresponds to a subcarrier spacing preconfigured for a bandwidth part, BWP, in which the data channel and control channel are received. According to one or more embodiments, an indication of the first numerology is received at least in part by receiving signaling of an expansion factor, the expansion factor configured to change a subcarrier spacing from a preconfigured subcarrier spacing for a bandwidth part, BWP, to a first subcarrier spacing associated with the first numerology using the expansion factor.

According to one or more embodiments, the signaling corresponds to one of semi-static radio resource control, RRC, signaling, semi-persistent medium access control, MAC, control element, CE, signaling and downlink control information, DCI, signaling. According to one or more embodiments, the DCI signaling includes a subcarrier spacing section field and a frequency domain resource allocation field that are jointly encoded as a bit field having a predefined bit size.

According to one or more embodiments, a subset of most significant bits in the bit field are configured to indicate the first subcarrier spacing. According to one or more embodiments, a transmission including the data channel rate matched to a channel state information reference signal, CSI-RS, associated with a different subcarrier spacing than the first subcarrier spacing is received. According to one or more embodiments, a first sounding reference signal is transmitted in accordance with the mixed numerology, the first sounding reference signal, SRS, being part of a plurality of SRSs associated with a plurality of wireless device, the plurality of SRSs being associated with a plurality of subcarrier spacings including at least a first subcarrier spacing associated with the first numerology and being configured to be multiplexed for processing.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating example methods implemented in a communication system including a host computer, a network node and a wireless device for receiving user data from the wireless device at a host computer according to some embodiments of the present disclosure;

FIG. 7 is a flowchart illustrating example methods implemented in a communication system including a host computer, a network node and a wireless device for receiving user data at a host computer according to some embodiments of the present disclosure;

FIG. 20 is another diagram of PDSCH rate-matching around CSI-RS with different SCS;

DETAILED DESCRIPTION

Figure 1:
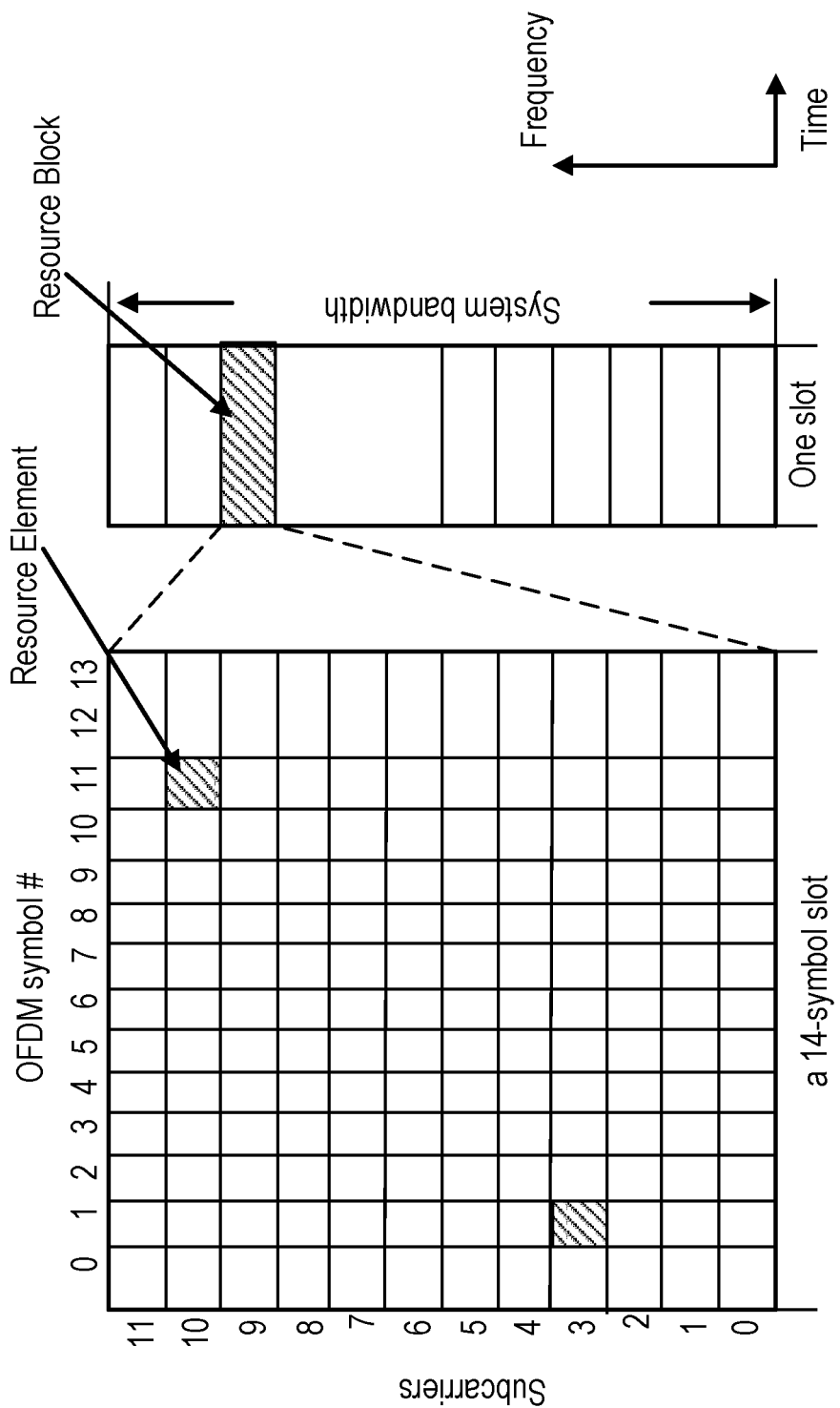
FIG. 1 is a diagram of a NR physical resource grid.

Multi-carrier waveforms such as OFDM and DFT-s-OFDM are more sensitive to phase noise compared to single-carrier waveforms, which makes it very difficult in practice/real world to achieve good link performance with high order modulation (such as 16QAM and above) in high frequency bands. This phase noise sensitivity problem can be addressed, for example, by choice of sub-carrier spacing. Generally speaking, larger OFDM subcarrier spacing provides better robustness against phase noise. Existing NR specification/wireless communication protocols support OFDM subcarrier spacing up to 480 kHz (with $\mu=4$). To combat the high phase noise and to address large addressable bandwidths in high frequency bands, it may be beneficial to increase the subcarrier spacing up to 960 kHz, 1920 kHz, 3840 kHz or even higher. Furthermore, the effect of Doppler increases with carrier frequency, which also help push for the adoption of larger subcarrier spacings.

However, adopting larger subcarrier spacing brings a number of drawbacks. For example, larger subcarrier spacing in frequency domain implies shorter OFDM duration in time domain, and hence shorter cyclic prefix (CP). In LTE and NR systems, CP length is dimensioned to handle the maximum delay spread of the channel, which is directly related to the cell range. A shorter CP implies a smaller cell range that the system is able to support, thereby possibly limiting coverage.

Larger subcarrier spacing expands the transmission signal bandwidth (assuming the same subcarrier allocation), which leads to more noise being captured in the receiver and hence reduces the Signal-to-Noise-Ratio (SNR), given the constraint on the transmission power that may be imposed by regulation or by hardware limitation. A reduced SNR not only degrades the link performance but also reduces the link budget and further reduces the cell range.

Further, larger subcarrier spacing corresponds to shorter OFDM symbol duration and shorter slot duration assuming the same NR frame structure is reused. For example, the slot duration is 125 us for SCS=120 kHz. With the SCS being increased to 960 kHz, the corresponding slot duration is reduced to 15.625 us. In NR, scheduling and time resource allocation is performed on the basis of OFDM symbol and slot. Large subcarrier spacing corresponds to shorter OFDM symbol and slot duration. Such small scheduling and time resource allocation granularity may become a significant challenge for the network equipment/network nodes and user devices/wireless devices. Meanwhile, smaller scheduling and time resource allocation granularity also leads to higher overhead which may reduce data throughput rates.

The teachings of the instant disclosure advantageously solve at least a portion of the problems described above at least in part by leveraging the usage of OFDM and DFT-s-OFDM waveforms in NR to higher frequency range as described herein. One or more embodiments described herein combine the advantage of large subcarrier spacing for robustness against high phase noise, and the advantage of small subcarrier spacing for better cell coverage. One or more embodiments described herein adopts a scheduling granularity determined by the basic numerology, reusing the current scheduling features and signaling framework in NR to a large extent. Therefore, one or more embodiments described herein helps to enable NR operation in mm-wave frequency bands with minimum specification impact and minimum technical complexity increase.

Before describing in detail exemplary embodiments, it is noted that the embodiments reside primarily in combinations of apparatus components and processing steps related to a configuring physical channels within a bandwidth part (BWP) with multiple numerologies such as to, for example, provide scheduling granularity determined by a basic numerology.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode such as those with respect to using multiple numerologies within a BWP. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The term "numerology" herein may comprise, e.g., any one or more of: frame duration, subframe or TTI duration, slot or minislot duration, symbol duration and the number of symbols per slot and subframe, subcarrier spacing, sampling frequency, Fast Fourier Transform (FFT) size, number of subcarriers per RB and RB bandwidth, number of RBs within a bandwidth, symbols per subframe, CP length, etc. The numerology determines the grid of REs in time and/or frequency domain.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for configuring physical channels within a bandwidth part (BWP) with multiple numerologies.

Figure 2:
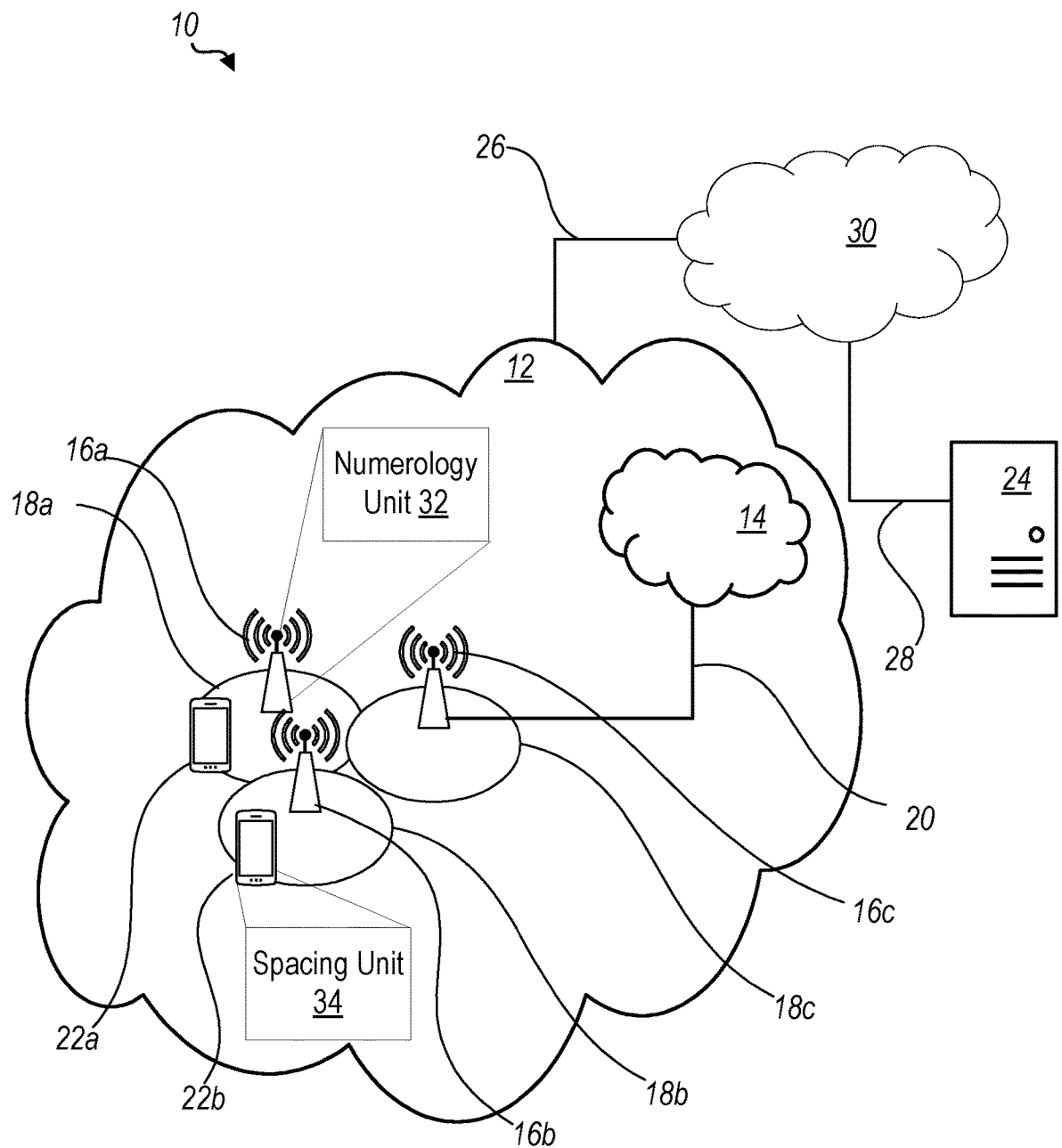
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a numerology unit 32 which is configured to perform one or more network node 16 functions as described herein such as with respect to configuring physical channels within a bandwidth part (BWP) with multiple numerologies. A wireless device 22 is configured to include a spacing unit 34 which is configured to perform one or more wireless devices 22 functions as described herein such as with respect to receiving, decoding, using, etc. physical channels within a bandwidth part (BWP) with multiple numerologies.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to transmit, receive, decode, process, store, relay, forward, encode, etc. information related to configuring physical channels within a bandwidth part (BWP) with multiple numerologies.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include numerology unit 32 configured to perform one or more network node 16 functions as described herein such as those functions with respect to configuring, transmission, determining, etc. of physical channels within a bandwidth part (BWP) with multiple numerologies.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a spacing unit 34 configured to perform one or more wireless device 22 functions as described herein such as those functions with respect to physical channels within a bandwidth part (BWP) with multiple numerologies.

Figure 3:
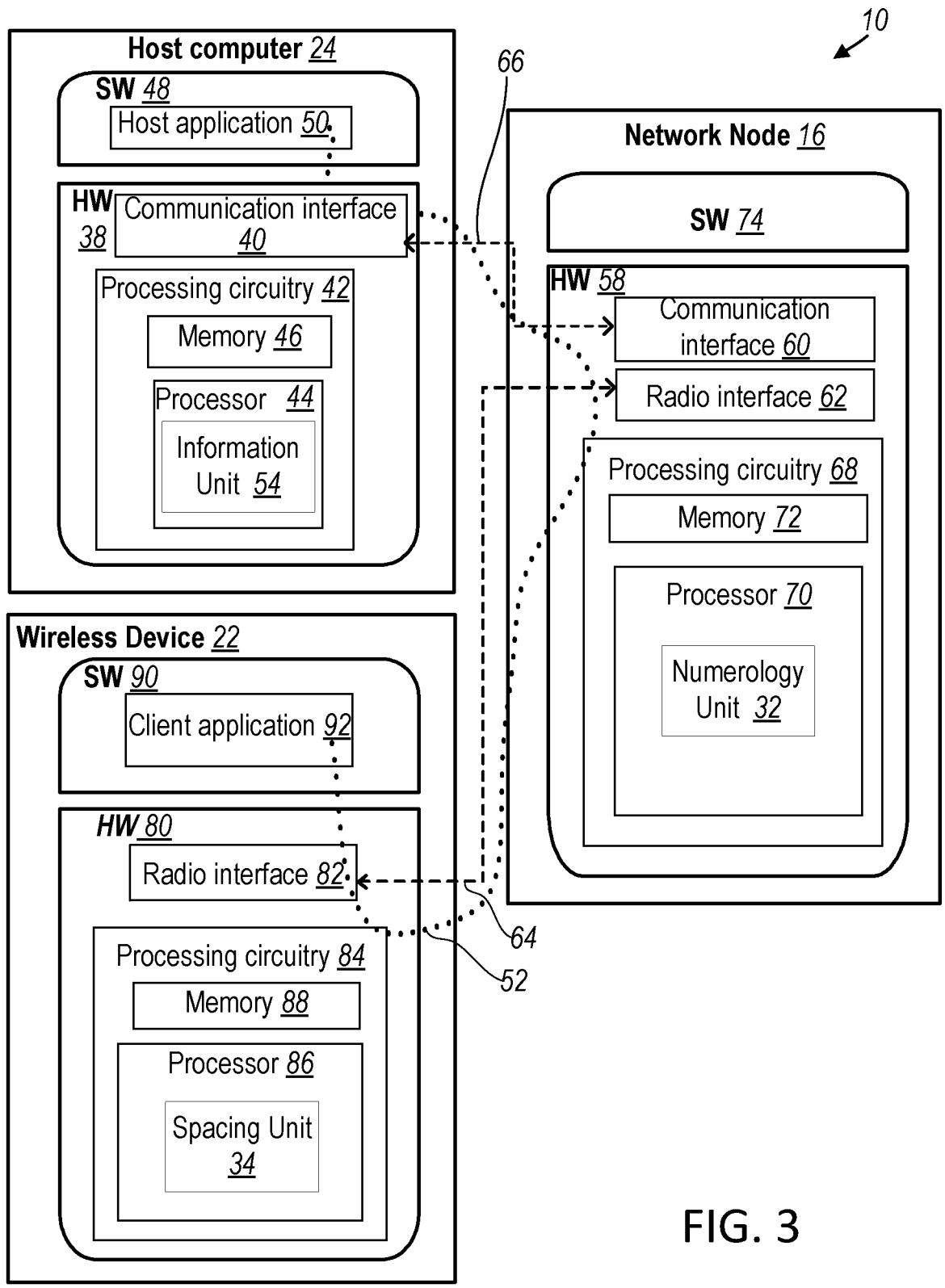
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further make decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as numerology unit 32, and spacing unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
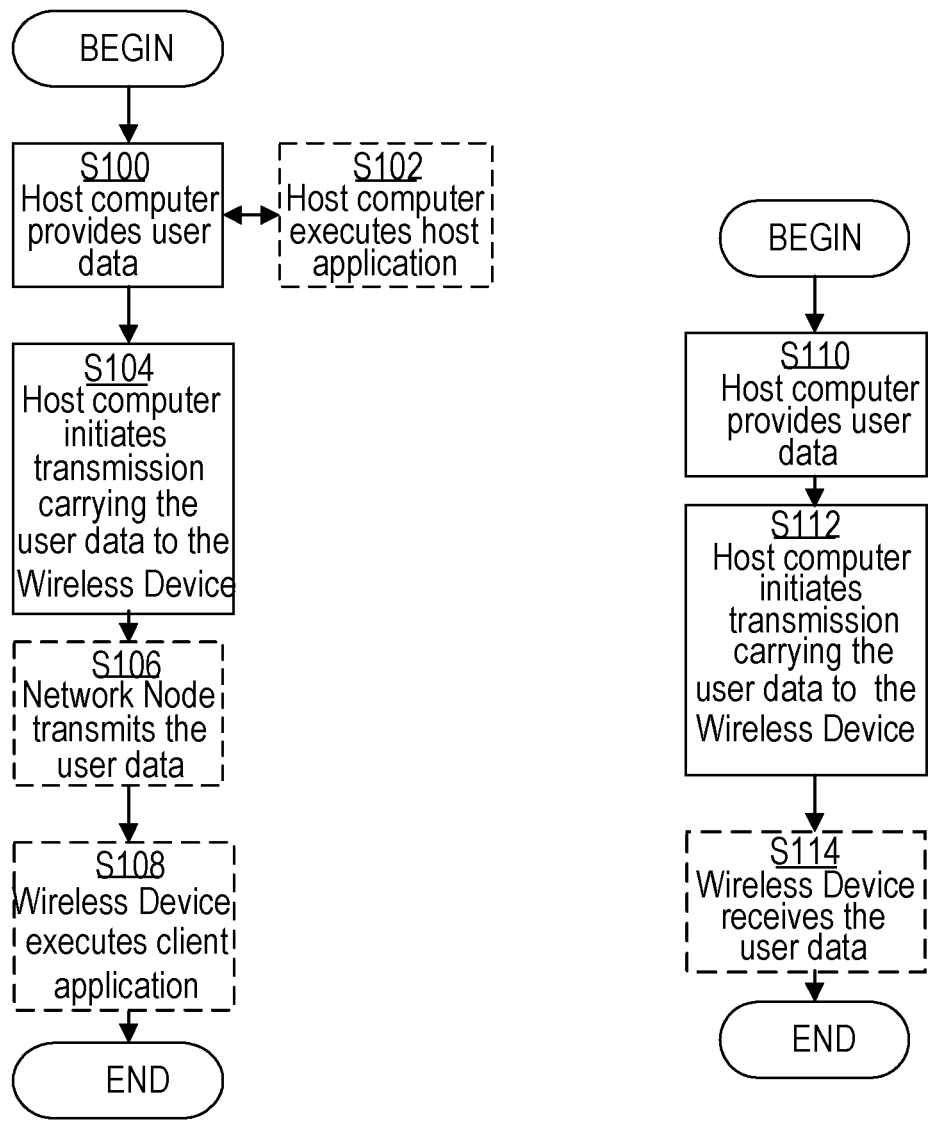
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
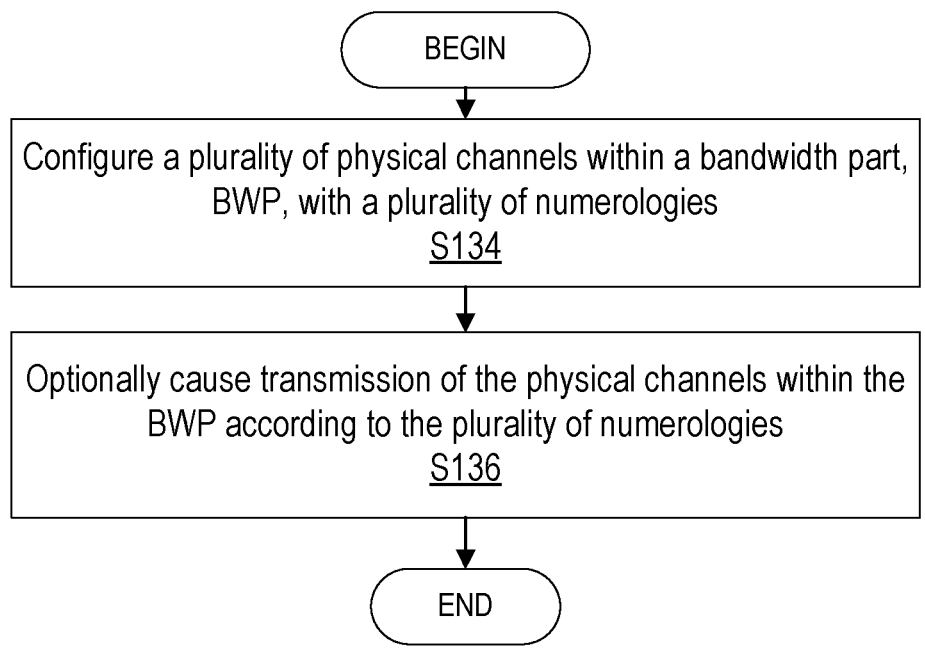
FIG. 8 is a flowchart of an example process in a network node according to some embodiments of the present disclosure.

FIG. 8 is a flowchart of an example process in a network node 16 according to some embodiments of the present disclosure. One or more Blocks and/or functions performed by network node 16 may be performed by one or more elements of network node 16 such as by numerology unit 32 in processing circuitry 68, processor 70, radio interface 62, etc. In one or more embodiments, network node 16 such as via one or more of processing circuitry 68, processor 70, numerology unit 32, communication interface 60 and radio interface 62 is configured to configure (Block S134) a plurality of physical channels within a bandwidth part, BWP, with a plurality numerologies, as described herein. In one or more embodiments, network node 16 such as via one or more of processing circuitry 68, processor 70, numerology unit 32, communication interface 60 and radio interface 62 is configured to optionally cause (Block S136) transmission of the physical channels within the BWP according to the plurality of numerologies, as described herein.

According to one or more embodiments, each numerology includes a respective subcarrier spacing, and the physical channels within the BWP correspond to at least one control channel and at least one data channel. According to one or more embodiments, the at least one control channel includes at least one of a physical downlink control channel and physical uplink control channel, and the at least one data channel includes at least one of a physical downlink shared channel and physical uplink shared channel.

According to one or more embodiments, the subcarrier spacing is based at least in part on at least one of a predefined basic subcarrier spacing and a subcarrier spacing expansion factor relative to the predefined basic subcarrier spacing. According to one or more embodiments, the subcarrier spacing is applied to at least one of a corresponding demodulation reference signal, DMRS, and a sounding reference signal, SRS.

Figure 9:
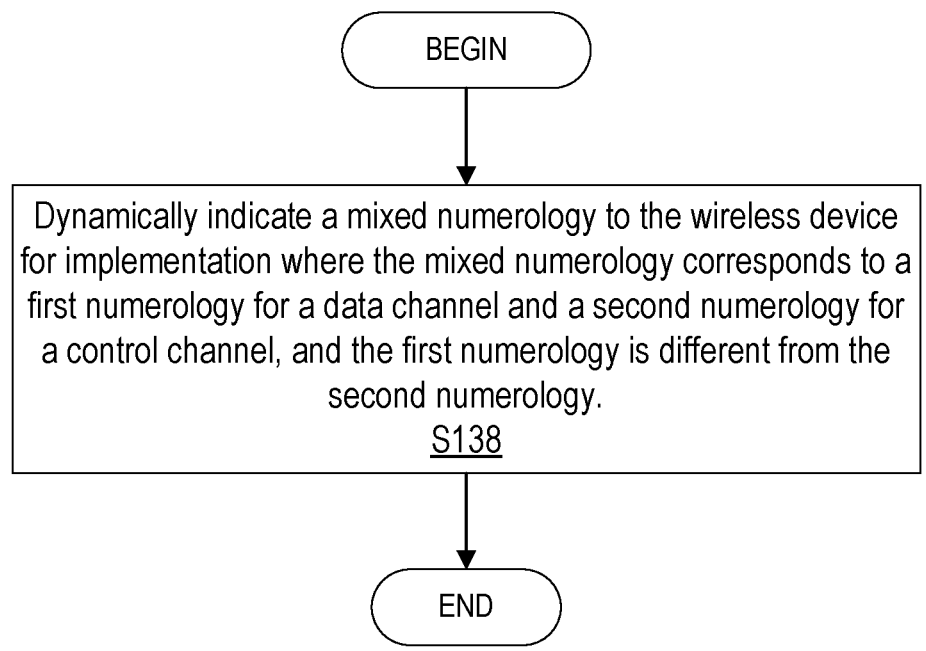
FIG. 9 is a flowchart of another example process in a network node according to some embodiments of the present disclosure.

FIG. 9 is a flowchart of another example process in a network node 16 according to some embodiments of the present disclosure. One or more Blocks and/or functions performed by network node 16 may be performed by one or more elements of network node 16 such as by numerology unit 32 in processing circuitry 68, processor 70, radio interface 62, etc. In one or more embodiments, network node 16 is configured to dynamically indicate (Block S138) a mixed numerology to the wireless device 22 for implementation where the mixed numerology corresponding to a first numerology for a data channel and a second numerology for a control channel and where the first numerology is different from the second numerology, as described herein.

According to one or more embodiments, the processing circuitry 68 is further configured to indicate a preconfigured subcarrier spacing for a bandwidth part, BWP, in a carrier where the dynamically indicated mixed numerology is configured to change a subcarrier spacing for the data channel from the preconfigured subcarrier spacing to a first subcarrier spacing associated with the first numerology. The processing circuitry 68 is further configured to add at least one demodulation reference signal, DMRS, symbol to the data channel to densify a DMRS allocation that is based on the preconfigured subcarrier spacing, as described herein.

According to one or more embodiments, the additional at least one DMRS symbol is distributed throughout the data channel in a time domain. According to one or more embodiments, the additional at least one DMRS symbol is front-loaded next to another DMRS symbol of the DMRS allocation. According to one or more embodiments, the data channel and control channel are allocated within a bandwidth part, BWP, that is defined by a plurality of subcarrier spacings where the plurality of subcarrier spacing includes a first subcarrier spacing associated with the first numerology and a second subcarrier spacing associated with the second numerology.

According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing. According to one or more embodiments, the plurality of subcarrier spacings are based on a largest subcarrier spacing of the plurality of subcarrier spacings. According to one or more embodiments, a resource block start position and a size of the BWP are based at least in part on the largest subcarrier spacing of the plurality of subcarrier spacings.

According to one or more embodiments, the first numerology for the data channel is associated with a larger subcarrier spacing than a subcarrier spacing associated with the second numerology. According to one or more embodiments, the subcarrier spacing associated with the second numerology corresponds to a subcarrier spacing preconfigured for a bandwidth part, BWP, in which the data channel and control channel are transmitted. According to one or more embodiments, the processing circuitry is further configured to indicate the first numerology at least in part by signaling of an expansion factor, the expansion factor configured to change a subcarrier spacing from a preconfigured subcarrier spacing for a bandwidth part, BWP, to a first subcarrier spacing associated with the first numerology using the expansion factor.

According to one or more embodiments, the signaling corresponds to one of semi-static radio resource control, RRC, signaling, semi-persistent medium access control, MAC, control element, CE, signaling and downlink control information, DCI, signaling. According to one or more embodiments, the DCI signaling includes a subcarrier spacing section field and a frequency domain resource allocation field that are jointly encoded as a bit field having a predefined bit size. According to one or more embodiments, a subset of most significant bits in the bit field are configured to indicate the first subcarrier spacing. According to one or more embodiments, the processing circuitry 68 is further configured to rate match the data channel to a channel state information reference signal, CSI-RS, associated with a different subcarrier spacing than the first subcarrier spacing. According to one or more embodiments, the processing circuitry 68 is further configured to multiplex a plurality of sounding reference signals, SRSs, received from a plurality of wireless devices 22 where the plurality of SRSs are associated with a plurality of subcarrier spacings including at least a first subcarrier spacing associated with the first numerology.

Figure 10:
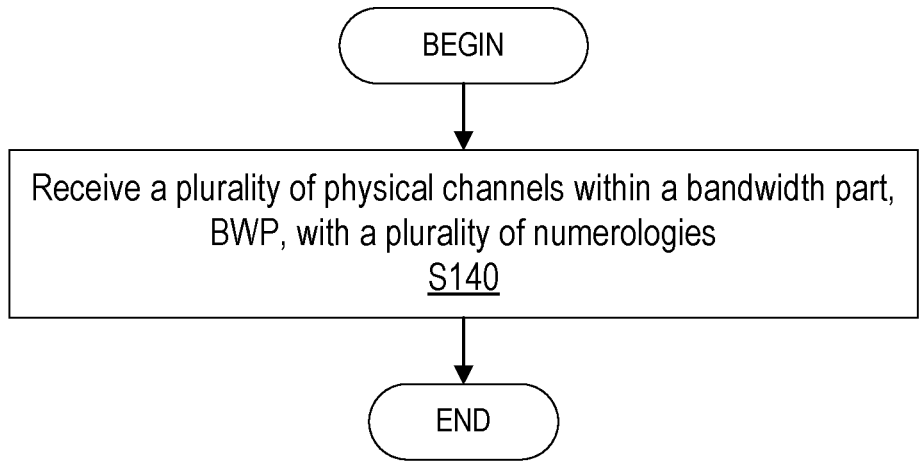
FIG. 10 is a flowchart of an example process in a wireless device according to some embodiments of the present disclosure.

FIG. 10 is a flowchart of an example process in a wireless device 22 according to some embodiments of the present disclosure. One or more Blocks and/or functions performed by wireless device 22 may be performed by one or more elements of wireless device 22 such as by spacing unit 34 in processing circuitry 84, processor 86, radio interface 82, etc. In one or more embodiments, wireless device such as via one or more of processing circuitry 84, processor 86, spacing unit 34 and radio interface 82 is configured to receive (Block S140) a plurality of physical channels within a bandwidth part, BWP, with a plurality numerologies, as described herein.

According to one or more embodiments, each numerology includes a respective subcarrier spacing and the physical channels within the BWP corresponds to at least one control channel and at least one data channel. According to one or more embodiments, the at least one control channel includes at least one of a physical downlink control channel and physical uplink control channel, and the at least one data channel includes at least one of a physical downlink shared channel and physical uplink shared channel. According to one or more embodiments, the subcarrier spacing is based at least in part on at least one of a predefined basic subcarrier spacing and a subcarrier spacing expansion factor relative to the predefined basic subcarrier spacing. According to one or more embodiments, the subcarrier spacing is applied to at least one of a corresponding demodulation reference signal, DMRS, and a sounding reference signal, SRS.

Figure 11:
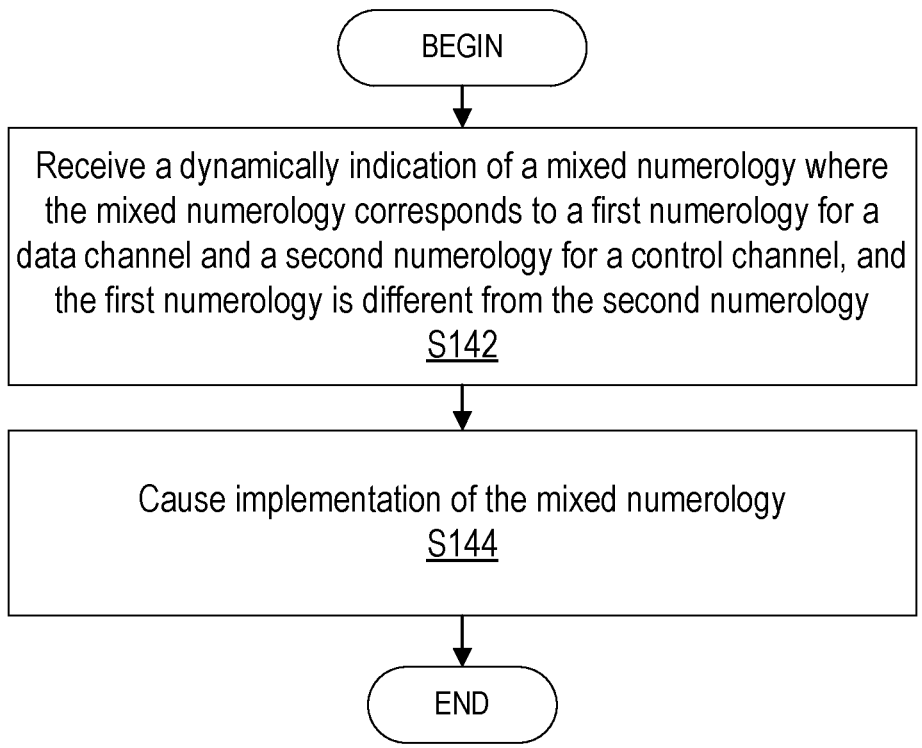
FIG. 11 is a flowchart of another example process in a wireless device according to some embodiments of the present disclosure.

FIG. 11 is a flowchart of another example process in a wireless device 22 according to some embodiments of the present disclosure. One or more Blocks and/or functions performed by wireless device 22 may be performed by one or more elements of wireless device 22 such as by spacing unit 34 in processing circuitry 84, processor 86, radio interface 82, etc. In one or more embodiments, wireless device 22 is configured to receive (Block S142) a dynamically indication of a mixed numerology where the mixed numerology corresponds to a first numerology for a data channel and a second numerology for a control channel and where the first numerology is different from the second numerology, as described herein. The wireless device 22 is configured to cause (Block S144) implementation of the mixed numerology, as described herein.

According to one or more embodiments, the processing circuitry 84 is further configured to receive an indication for a preconfigured subcarrier spacing for a bandwidth part, BWP, in carrier where the dynamically indicated mixed numerology is configured to change a subcarrier spacing for the data channel from the preconfigured subcarrier spacing to a first subcarrier spacing associated with the first numerology. The data channel includes at least one added demodulation reference signal, DMRS, symbol for densifying a DMRS allocation that is based on the preconfigured subcarrier spacing. According to one or more embodiments, the at least one added DMRS symbol is distributed throughout the data channel in a time domain. According to one or more embodiments, the at least one added DMRS symbol is front-loaded next to another DMRS symbol of the DMRS allocation.

According to one or more embodiments, the data channel and control channel are allocated within a bandwidth part, BWP, that is defined by a plurality of subcarrier spacings, the plurality of subcarrier spacing including a first subcarrier spacing associated with the first numerology and a second subcarrier spacing associated with the second numerology. According to one or more embodiments, the plurality of subcarrier spacings are based on a preconfigured subcarrier spacing for the BWP. According to one or more embodiments, a resource block start position and a size of the BWP are based at least in part on the preconfigured subcarrier spacing.

According to one or more embodiments, the plurality of subcarrier spacings are based on a largest subcarrier spacing of the plurality of subcarrier spacings. According to one or more embodiments, a resource block start position and a size of the BWP are based at least in part on the largest subcarrier spacing of the plurality of subcarrier spacings. According to one or more embodiments, the first numerology for the data channel is associated with a larger subcarrier spacing than a subcarrier spacing associated with the second numerology. According to one or more embodiments, the subcarrier spacing associated with the second numerology corresponds to a subcarrier spacing preconfigured for a bandwidth part, BWP, in which the data channel and control channel are received.

According to one or more embodiments, the processing circuitry 84 is further configured to receive an indication of the first numerology at least in part by receiving signaling of an expansion factor where the expansion factor is configured to change a subcarrier spacing from a preconfigured subcarrier spacing for a bandwidth part, BWP, to a first subcarrier spacing associated with the first numerology using the expansion factor. According to one or more embodiments, the signaling corresponds to one of semi-static radio resource control, RRC, signaling, semi-persistent medium access control, MAC, control element, CE, signaling and downlink control information, DCI, signaling. According to one or more embodiments, the DCI signaling includes a subcarrier spacing section field and a frequency domain resource allocation field that are jointly encoded as a bit field having a predefined bit size.

According to one or more embodiments, a subset of most significant bits in the bit field are configured to indicate the first subcarrier spacing. According to one or more embodiments, the processing circuitry 84 is further configured to receive a transmission including the data channel rate matched to a channel state information reference signal, CSI-RS, associated with a different subcarrier spacing than the first subcarrier spacing. According to one or more embodiments, the processing circuitry 84 is further configured to transmit a first sounding reference signal in accordance with the mixed numerology, the first sounding reference signal, SRS, being part of a plurality of SRSs associated with a plurality of wireless device, the plurality of SRSs being associated with a plurality of subcarrier spacings including at least a first subcarrier spacing associated with the first numerology and being configured to be multiplexed for processing.

Having generally described arrangements for configuring/scheduling physical channels within a bandwidth part (BWP) with multiple numerologies, details for these arrangements, functions and processes are provided as follows, and which may be implemented by the network node 16, wireless device 22 and/or host computer 24.

Embodiments provide configuring physical channels within a bandwidth part (BWP) with multiple numerologies. Further, the BWP configuration in a carrier may be wireless device 22 specific, except for initial downlink and uplink BWPs that are common for multiple wireless devices 22 in the cell. The wireless device 22 specific BWPs may be configured with mixed numerologies, as described herein, that are multiplexed in both time and frequency domains in a carrier. As such, in one or more embodiments, the network node 16 and wireless device 22 may be required to handle mixed numerologies across multiple BWPs for data transmission/reception and rate-matching purposes, for example. As used herein, in one or more embodiments, the term FR3 (Frequency Range 3) may refer to a frequency range above 52.6 GHz.

In one or more embodiments, one or more network node 16 functions described below may be performed by one or more elements of network node 16 such as by numerology unit 32 in processing circuitry 68, processor 70, radio interface 62, etc. In one or more embodiments, one or more wireless device 22 functions described below may be performed by one or more elements of wireless device 22 such as by spacing unit 34 in processing circuitry 84, processor 86, radio interface 82, etc.

For NR operation in FR3, using a relatively small subcarrier spacing for control and data channels provides a one or more advantages in terms of longer cyclic prefix, smaller transmission bandwidth and hence larger SNR in power limited scenarios, and larger slot and symbol duration to ease scheduling and reduce signaling overhead. On the other hand, a larger subcarrier spacing provides robustness against high phase noise and Doppler, enabling high order modulation. A larger subcarrier spacing may help reduce system latency.

Selection of subcarrier spacing by, for example, network node 16, may also consider some other aspects, such as one or more of operation band, channel bandwidth and latency requirement. Higher frequency bands may provide large operation channel bandwidth, which may require large subcarrier spacing given the constraints on the FFT size. Larger subcarrier spacing is also beneficial for application with low latency requirement due to its shorter OFDM symbol and slot duration.

To help meet the different requirements from the above-mentioned scenarios, a multi-numerology method is described herein. In one or more embodiments, the multi-numerology method allows flexible usages of multiple numerologies for different physical channels and signals. Meanwhile, in one or more embodiments, the multi-numerology method helps address the scheduling and time resource allocation aspects for NR operation in FR3.

Embodiment 1: Mixed Subcarrier Spacing (SCS) in a BWP

A BWP such as in a NR carrier specifies a basic subcarrier spacing which is used for all and/or a plurality of channels and reference signals in the BWP unless specified elsewhere or configured otherwise. Moreover, different subcarrier spacings than the basic subcarrier spacing may be specified for PDSCH, PUSCH, CSI-RS and SRS.

The basic subcarrier spacing of a BWP can be based on the existing BWP::subcarrierSpacing field or by a new field in the BWP configuration. To help achieve a better link budget, relatively small subcarrier spacings (such as 120, 240 or 480 kHz) can be specified (e.g., configured, indicated and/or predefined in one or more modified wireless communications standards) as the basic subcarrier spacing for BWPs in operation bands in FR3.

PDSCH/PUSCH in the BWP may be configured such as by network node 16 with different subcarrier spacings than the basic subcarrier spacing which may better fit the actual application scenarios. For example, larger OFDM subcarrier spacing such as 960, 1920, or 3840 kHz may be used in one application scenario to mitigate high phase noise and Doppler shift in high frequency range.

Figure 12:
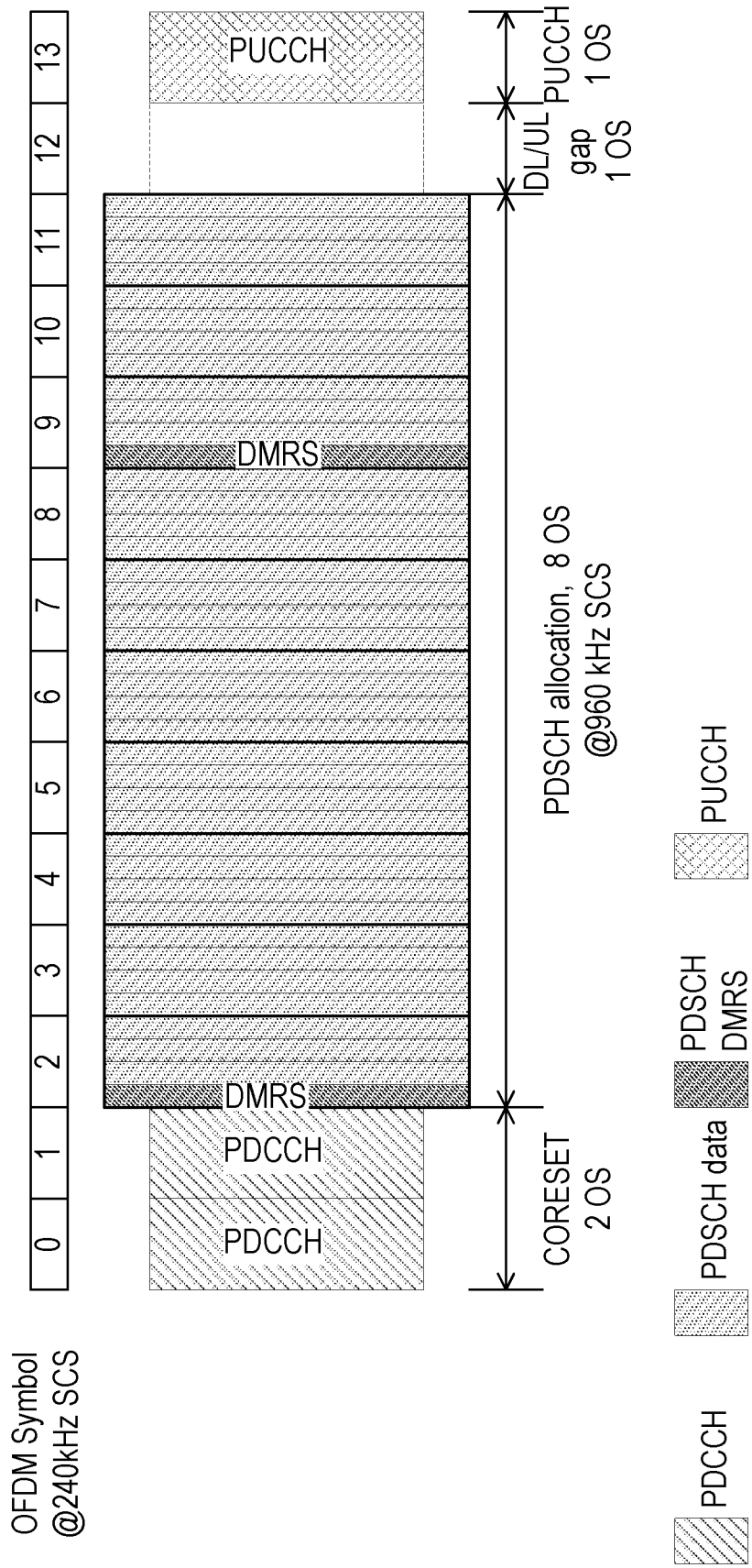
FIG. 12 is a diagram of an example DL slot frame structure with multi-numerology.

An example frame structure of a DL slot with mixed subcarrier spacing is illustrated in FIG. 12. In this example, a basic subcarrier spacing of 240 kHz is chosen (e.g., selected, determined, etc.) for a NR carrier in FR3. PDCCH uses the basic subcarrier spacing of the BWP, while PDSCH is configured with a larger subcarrier spacing of 960 kHz such as by network node 16.

In the example slot as shown in FIG. 12, the first two OFDM symbols (OSs) are configured as PDCCH CORESET such as by network node 16 where the last OS is assigned to PUCCH transmission and the OS from 2 to 11 are allocated for PDSCH transmission, and the OS between PDSCH and PUCCH is reserved for DL/UL switching purpose. All OS(s) in the resource allocation are corresponding to the basic subcarrier spacing of the BWP such as subcarrier spacing of 240 kHz. For PDSCH, in one or more embodiments, one basic OS corresponds to 4 PDSCH OS with 960 kHz subcarrier spacing.

Figure 13:
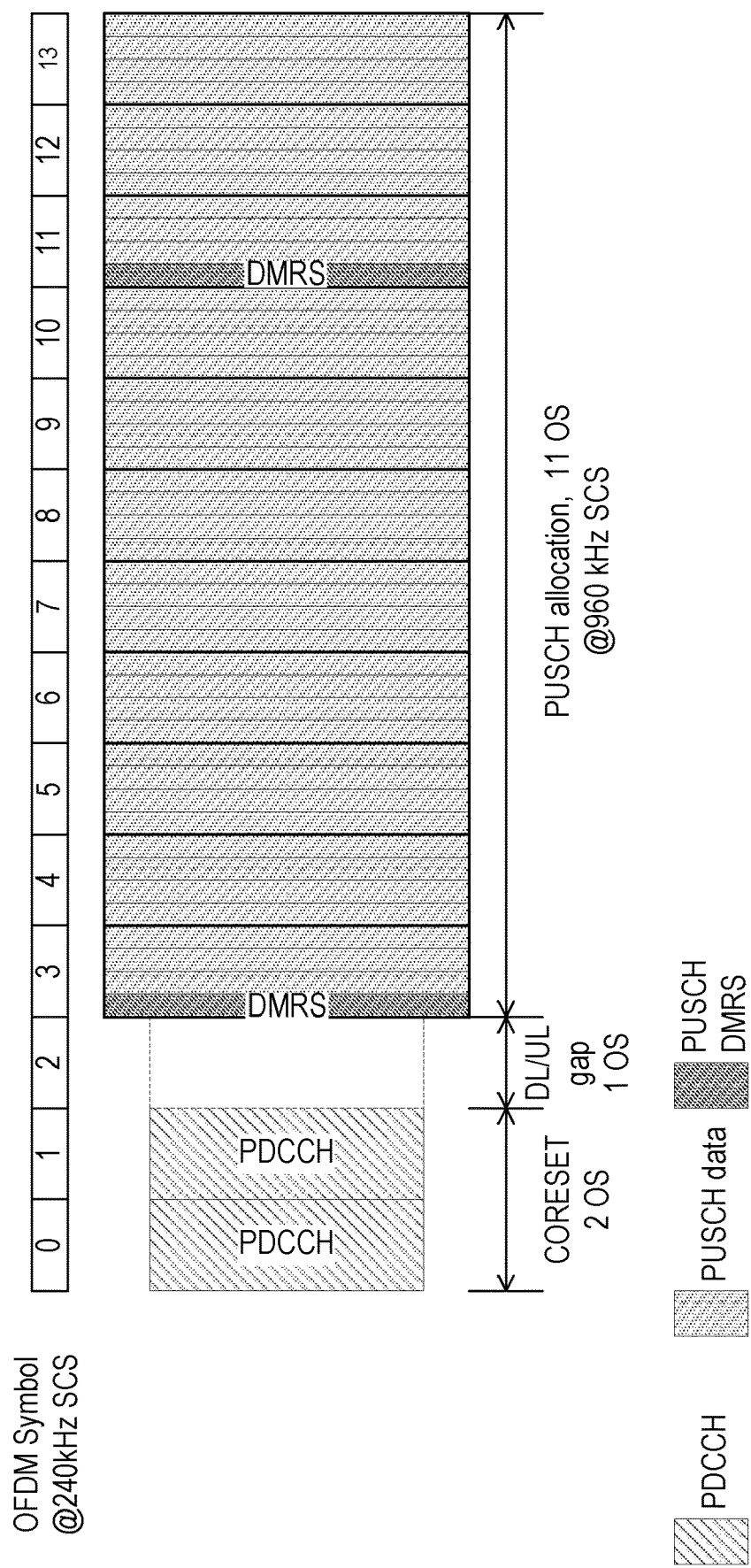
FIG. 13 is a diagram of an example UL slot frame structure with multi-numerology.

An example frame structure of a UL slot is illustrated in FIG. 13. In this example, a basic subcarrier spacing of 240 kHz is chosen for a NR carrier in FR3. PDCCH uses the basic subcarrier spacing of the BWP. PUSCH is configured with a larger subcarrier spacing of 960 kHz such as by network node 16, resulting in one basic OS corresponding to 4 PUSCH OS.

Embodiment 2a: PDSCH/PUSCH SCS Configuration Aspects

In one or more embodiments, the PDSCH/PUSCH subcarrier spacing for a band is fixed such as in the wireless communication standard such as in the NR system specifications documents. Therefore, in one or more embodiments, the network node 16 and/or wireless device 22 may be preconfigured with a fixed subcarrier spacing based on wireless communication standards are modified as described herein.

In one or more embodiments, the PDSCH/PUSCH subcarrier spacing for a band is determined such as by network node 16 by a fixed subcarrier spacing expansion factor relative to the basic subcarrier spacing of a BWP provided by MIB or other higher layer signaling. The fixed subcarrier spacing expansion factor may be defined in wireless communication standards such as in the NR system specifications documents.

In one or more embodiments, the PDSCH/PUSCH subcarrier spacing can be semi-statically configured by RRC signaling such as by network node 16. The PDSCH/PUSCH subcarrier spacing can be specified as BWP specific parameter applicable to a particular wireless device 22, or as cell specific parameter applicable to all wireless devices in the cell. The subcarrier spacing for PDSCH/PUSCH can be specified with an absolute value, or by a subcarrier spacing expansion factor with respect to the basic subcarrier spacing of the associated BWP. Absence of the PDSCH/PUSCH subcarrier spacing configuration may implies the basic subcarrier spacing of the associated BWP is applied.

Furthermore, the PDSCH/PUSCH subcarrier spacing can be specified semi-persistently by MAC control elements (CEs) such as by network node 16 possibly with reference to a list of subcarrier spacing candidates previously configured by RRC signaling.

In one or more embodiments, the PDSCH/PUSCH subcarrier spacing can be indicated dynamically in PDSCH/PUSCH scheduling DCIs such as by network node 16.

In one nonlimiting embodiment, the subcarrier spacing of the PDSCH/PUSCH scheduled by the DCI is determined such as by network node 16 based at least in part on the modulation order for the PDSCH/PUSCH. If the QPSK modulation is used, then the basic subcarrier spacing is applied to the PDSCH/PUSCH. If the 16QAM or higher order modulation is used, then a larger subcarrier spacing, as may be determined as described above, is applied to the PDSCH/PUSCH. In a further nonlimiting embodiment, the basic subcarrier spacing can be applied if the transmission is a rank 1 transmission and a larger subcarrier spacing, as determined in the above, is applied if the transmission is a higher rank MIMO transmission.

In another nonlimiting embodiment, an optional field such as subcarrierSpacing can be introduced (e.g., added to, configured in, etc.) to PDSCH/PUSCH scheduling DCIs with the possible range of subcarrier spacings for the scheduled PDSCH/PUSCH configurable by RRC signaling.

In another nonlimiting embodiment, the wireless device 22 is configured with one or more radio network temporary identifiers (RNTI) wherein each one of the RNTIs is associated with a pre-configured or specified subcarrier spacing or subcarrier spacing expansion factor. The SCS or SCS expansion factor of the PDSCH/PUSCH scheduled by the DCI is then indicated such as by network node 16 to the wireless device implicitly by scrambling the CRC of the DCI message by one of the RNTI(s) configured to the wireless device 22. In one or more embodiments, the wireless device 22 may be configured such as by network node 16 to be able to properly decode a specific CRC such that scrambling using a specific CRC decodable by one a specific wireless device 22 may correspond to providing an implicit indication.

In a variation of this embodiment, the SCS or SCS expansion factor is associated with a pre-configured or specified MCS table, and an MCS-RNTI used to indicate the MCS table to the wireless device 22 simultaneously indicates the SCS or SCS expansion factor.

To facilitate time for the wireless device 22 to switch subcarrier spacing, a gap (e.g., resource(s) gap, time gap, etc.) can be introduced/configured such as by network node 16 from the end of the scheduling DCI on PDCCH to the start of the scheduled PDSCH for the case when PDSCH is using a different subcarrier spacing than PDCCH. In 3GPP Rel-15 NR, a gap may be signaled to the wireless device 22 through the slot offset parameter and/or the starting symbol of the PDSCH as indicated in the time domain resource allocation field. In one or more embodiments and/or situations described herein, when PDCCH and PDSCH is using different subcarrier spacing within the same BWP, the wireless device 22 may not expect a gap smaller than its subcarrier switch capability to be signaled. In one variant, the time needed for subcarrier switching may depend and/or be based at least in part on the combination of the subcarrier spacing for PDCCH and PDSCH. For the special case when the subcarrier is the same, no gap may be configured and/or indicated to the wireless device 22.

Embodiment 2b: Joint Encoding of Subcarrier Spacing Section and Frequency Domain Resource Allocation for PDSCH/PUSCH Scheduling DCI In one or more embodiments, the subcarrier spacing section field and the frequency domain resource allocation field can be encoded jointly in the scheduling DCI. This joint encoding may be performed at least in part by using lower subcarrier spacing for smaller frequency domain resource allocations and larger subcarrier spacing for larger frequency domain resource allocations.

As one nonlimiting example, consider a carrier with maximum bandwidth of 2.16 GHz and three possible subcarrier spacing for the PDSCH/PUSCH: 240, 480 or 960 kHz. Some wireless communication standards such as NR, system specs are written assuming the transceivers are designed to support a maximum FFT size of 4096. As a result, the maximum number of RBs supported in NR is 275 RBs. Using a 240 kHz subcarrier spacing, a PDSCH/PUSCH can be scheduled to occupy between 1 and 275 RBs, i.e., up to 275×12×240 kHz=792 MHz. To schedule a large frequency domain allocation, 480 kHz subcarrier spacing can be used to allocate between 138 and 275 RBs. Finally, using 960 kHz, allocation can be made between 138 and 168 RBs (note that 168×12×960 kHz=1.935 GHz, which leaves about 10% guard band to adjacent channels).

Since frequency domain allocation sizes smaller than 138 RBs may be used only for 240 kHz subcarrier spacing and never used for 480 and 960 kHz subcarrier spacings, the resource indication value calculation procedure for 480 and 960 kHz subcarrier spacings can be modified to save on the number of bits needed: for example, the procedure in the "Type-1 frequency domain resource allocation" section is applied using $N_{BWP}^{size\prime}=N_{BWP}^{size}-137$ instead of $N_{BWP}^{size}$ and $L'_{RBs}=L_{RBs}-137$ instead of $L_{RBs}$. As used herein, the "modified procedure" may refer at least in part to using $N_{BWP}^{size\prime}=N_{BWP}^{size}-137$ instead of $N_{BWP}^{size}$ and $L'_{RBs}=L_{RBs}-137$ instead of $L_{RBs}$. Using this modified method, it can be observed that:

For SCS=240 kHz, RIV may need to be 16 bits. The maximum RIV is 37949, which means the most significant two bits may never be "11".

For SCS=480 kHz, RIV may need to be 14 bits. The maximum RIV is 9590, which means the most significant two bits may never be "11".

For SCS=960 kHz, RIV may need to be 9 bits.

Therefore, the subcarrier spacing section field and the frequency domain resource allocation field can be jointly encoded in one 16-bit field at the scheduling entity as follows:

For SCS=240 kHz, the 16-bit RIV as calculated in the "Type-1 frequency domain resource allocation" section is used as is.

For SCS=480 kHz, a 14-bit RIV calculated based at in part on the above modified procedure is computed first. "11" is the prepend to the most significant bits of the RIV to form a 16-bit joint indicator.

For SCS=960 kHz, a 9-bit RIV calculated based at least in part on the above modified procedure is computed first. "1111000" is the prepend to the most significant bits of the RIV to form a 16-bit joint indicator.

The receiver, i.e., wireless device 22, of the scheduling DCI can decode the joint encoded field as follows:

If the first 4 bits of the received joint encoded RIV are "1111",
960 kHz subcarrier spacing is to be used. The nine least significant bits from the joint encoded RIV are used to compute the frequency resource allocation based on the above modified procedure.

Else if the first 2 bits of the received joint encoded RIV are "11",
480 kHz subcarrier spacing is to be used. The 14 least significant bits from the joint encoded RIV are used to compute the frequency resource allocation based at least in part on the above modified procedure.

Else 240 kHz subcarrier spacing is to be used. The 16 bits of the joint encoded RIV are used to compute the frequency resource allocation based on the procedure in the "Type-1 frequency domain resource allocation" section.

While particular bit strings have been discussed above, it is understood that other bit strings may be used in accordance with the principles of the disclosure, where each bit string may provide a specific indication.

Embodiment 3: DMRS for PDSCH/PUSCH

The subcarrier spacing configured to/for PDSCH/PUSCH may also be applied to the corresponding DMRS. When the basic subcarrier spacing of the BWP is applied to PDSCH/PUSCH, the PDSCH/PUSCH DMRS patterns, as defined in existing wireless communication standards such as NR Rel-15, can be reused. When PDSCH/PUSCH is configured with a higher subcarrier spacing than the basic subcarrier spacing, new PDSCH/PUSCH DMRS mapping mechanism may need to be defined. One example of such as mechanism performed in two steps as described below:

Step 1. DMRS OSs based at least in in part on the basic subcarrier spacing are specified by the DMRS pattern as in the current NR specification.

Step 2. DMRS symbols are mapped such as by network node 16 the first PDSCH/PUSCH OSs (in the larger SCS) corresponding to the DMRS OSs (in the basic SCS) determined in step 1.

Meanwhile, when large subcarrier spacing is configured for PDSCH/PUSCH, additional DMRS symbols may be added such as by network node 16 to densify the DMRS allocation. The DMRS pattern specified in NR Rel-15 may be further optimized for operation in FR3 to achieve evenly spaced DMRS symbols in time domain.

Figure 14:
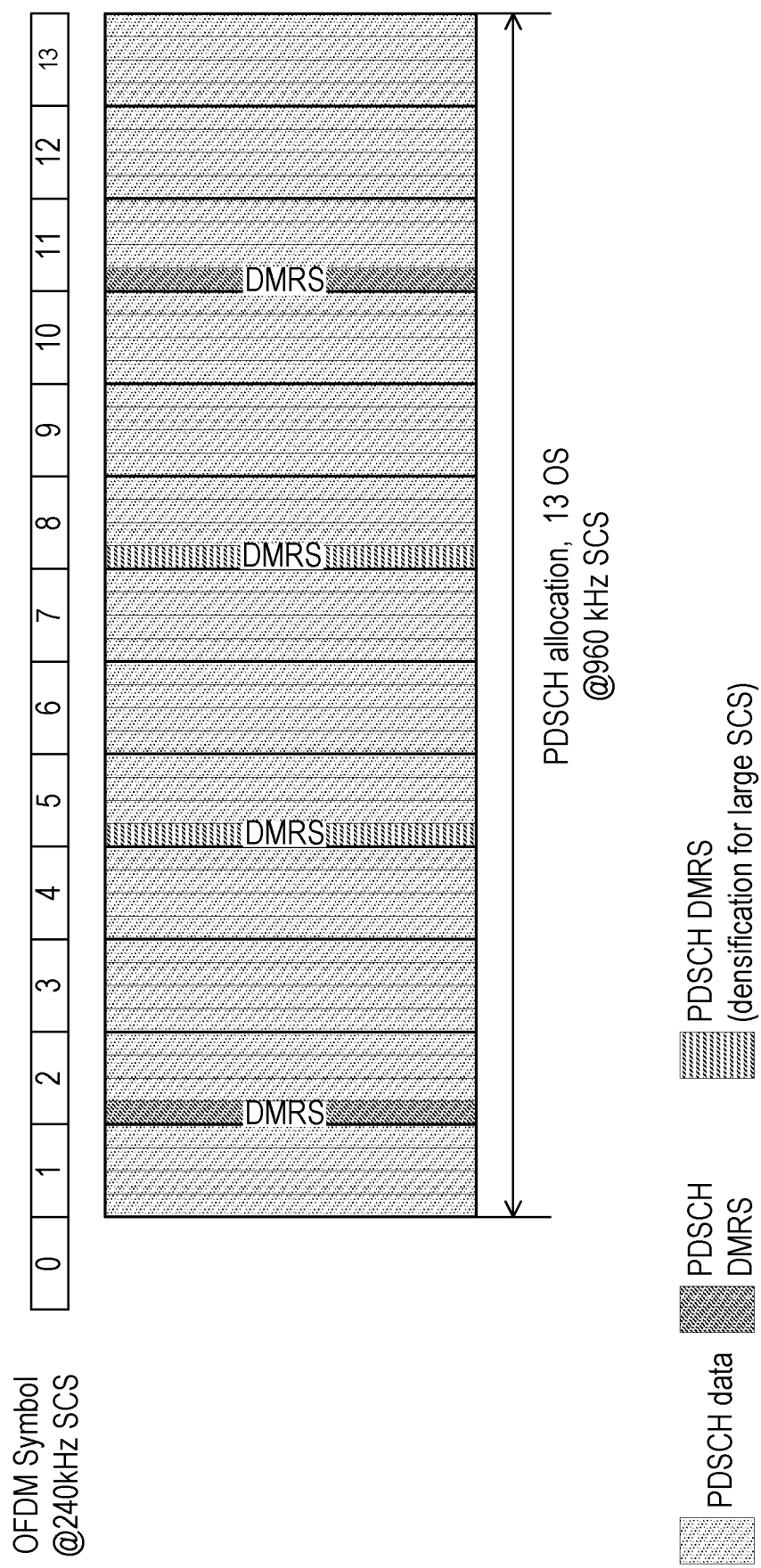
FIG. 14 is a diagram of PDSCH DMRS mapping in a downlink slot with mixed SCS and distributed densification.

An example of the mapping mechanism described above is illustrated in FIG. 14, where a basic subcarrier spacing of 240 kHz is chosen for a NR carrier in FR3 and a 960 kHz subcarrier spacing for PDSCH. The DMRS positions may be derived based at least in part on Table 7.4.1.1.2-3 in 3GPP RS 38.211 v16.2.0, for example, with further densification to cope with channel variation for large subcarrier spacing in higher frequency range.

Figure 15:
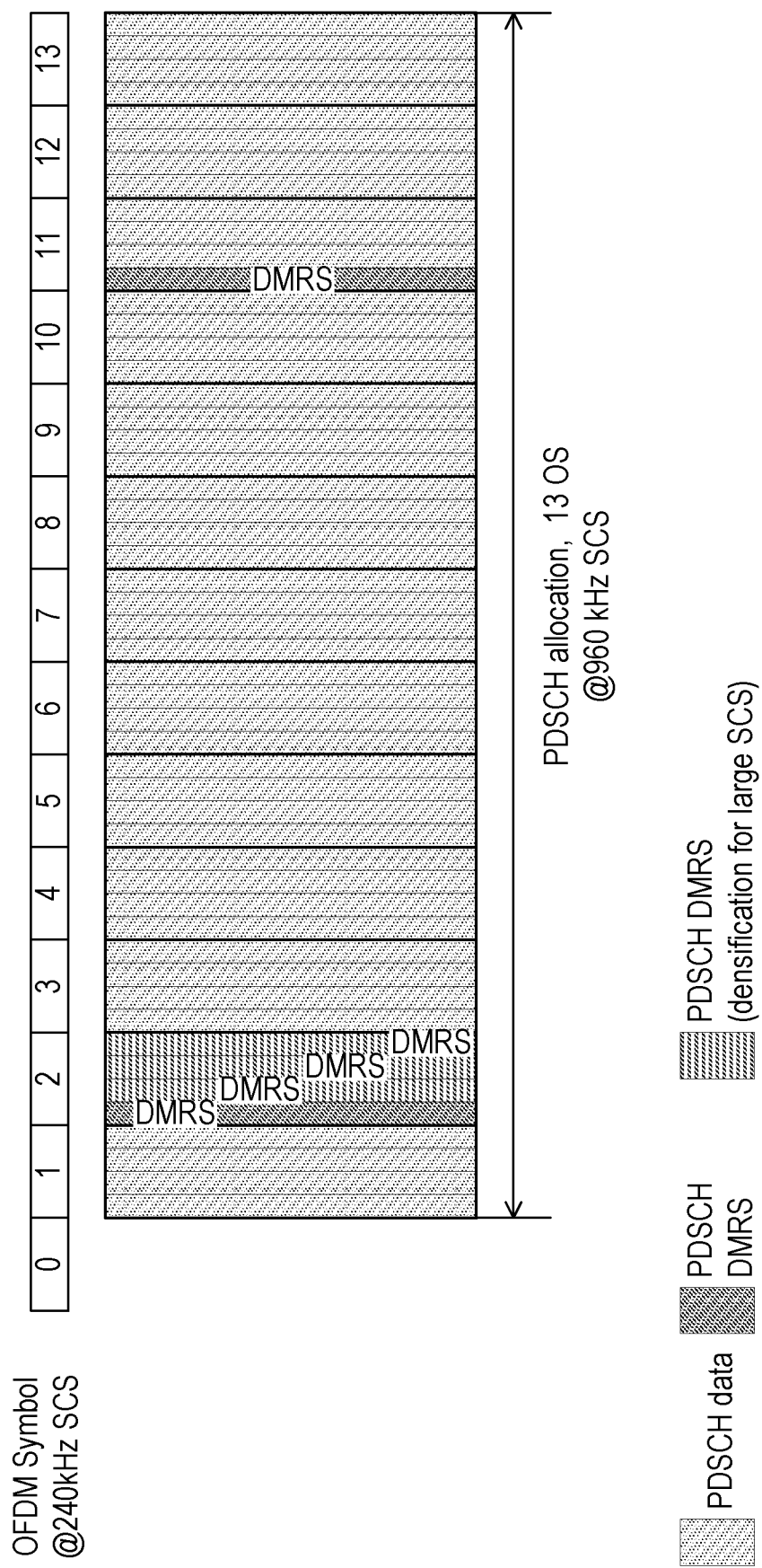
FIG. 15 is a diagram of PDSCH DMRS mapping in a DL slot with mixed SCS and front loaded densification.

In one or more embodiments, the DMRS densification can be performed such as by network node 16 by mapping additional DMRS symbols to the front part/portion of the PDSCH/PUSCH allocation in time domain, as illustrated in FIG. 15. This "front-loaded" arrangement of DMRS may enable and/or allow for early processing of DMRS such as by the wireless device, thereby helping reduce the overall PDSCH/PUSCH processing latency. In one implementation of the embodiment, the OFDM symbols immediately following the first DMRS symbol can be assigned for front-loaded densification, as illustrated in FIG. 15.

In another variant, in Step 2 above, the DMRS symbols are mapped to a configurable number N of PDSCH/PUSCH OSs (in the larger SCS) corresponding to the basic DMRS OSs (in the basic SCS) determined in step 1. The range of N is 1 . . . X where X is the SCS expansion factor.

Embodiment 4: Scheduling and Time Resource Allocation

NR operation in FR3 can reuse the overall scheduling mechanism in some wireless communication standards such as in NR Rel-15. TDD DL/UL common configuration, TDD DL/UL dedicated configuration, slot format, scheduling delay/offset parameters (K0/K1/K2) are based on the OFDM symbol duration and slot duration corresponding to the basic subcarrier spacing of the associated BWP.

Time resource allocation of physical channels and signals can be performed on the basis of an OFDM symbol corresponding to the basic subcarrier spacing of the associated BWP. Time resource allocation for PDSCH and PUSCH is indicated by start and length indicator (SLIV), which encodes the start and the length of the allocated resource(s) in time domain in terms of OFDM symbol corresponding to the basic subcarrier spacing of the associated BWP. For PDSCH/PUSCH configured with different subcarrier spacing than the basic subcarrier spacing, the actual allocated OFDM symbols can be calculated as:

$$N_{PXSCH}=N_{SLIV}*SCS_{PXSCH}/SCS_{basic}$$

where $N_{PXSCH}$ is the number of PDSCH/PUSCH OFDM symbols corresponding to the PDSCH/PUSCH subcarrier spacing, $N_{SLIV}$ is the number of OFDM symbols derived from SLIV, $SCS_{PDSCH}$ is the PDSCH/PUSCH subcarrier spacing, and $SCS_{basic}$ is the basic subcarrier spacing of the associated BWP.

Embodiment 5: SCS for CSI-RS

NR supports three categories of CSI-RS: CSI-RS for frequency and time tracking (aka TRS); CSI-RS for beam management (L1-RSRP measurement) and CSI-RS for channel acquisition (for CSI feedback for PDSCH link adaptation). Besides the CSI-RS categories mentioned above, NR also defines Zero Power CSI-RS (ZP-CSI-RS) that may be used for rate-matching PDSCH data symbols around CSI-RS intended for other wireless devices.

In one or more embodiments, CSI-RS for beam management, for example, which is not required to capture the full channel state (e.g., received power measurement only) can be transmitted with the basic subcarrier spacing of the associated BWP, and not necessarily with the full bandwidth occupied by PDSCH. In contrast, it is beneficial to configure CSI-RS for the purpose of link adaptation with the same subcarrier spacing and same bandwidth as PDSCH, so as to allow for and/or enable CSI feedback that accurately reflects the channel state across the full bandwidth occupied by PDSCH.

In one or more embodiments, all CSI-RS are transmitted with the same subcarrier spacing as PDSCH, which can be beneficial for the network node 16 and the wireless device 22 in the sense that the network node 16 and wireless device 22 may not need to handle PDSCH and CSI-RS with mixed subcarrier spacings simultaneously.

Figures 16, 17:
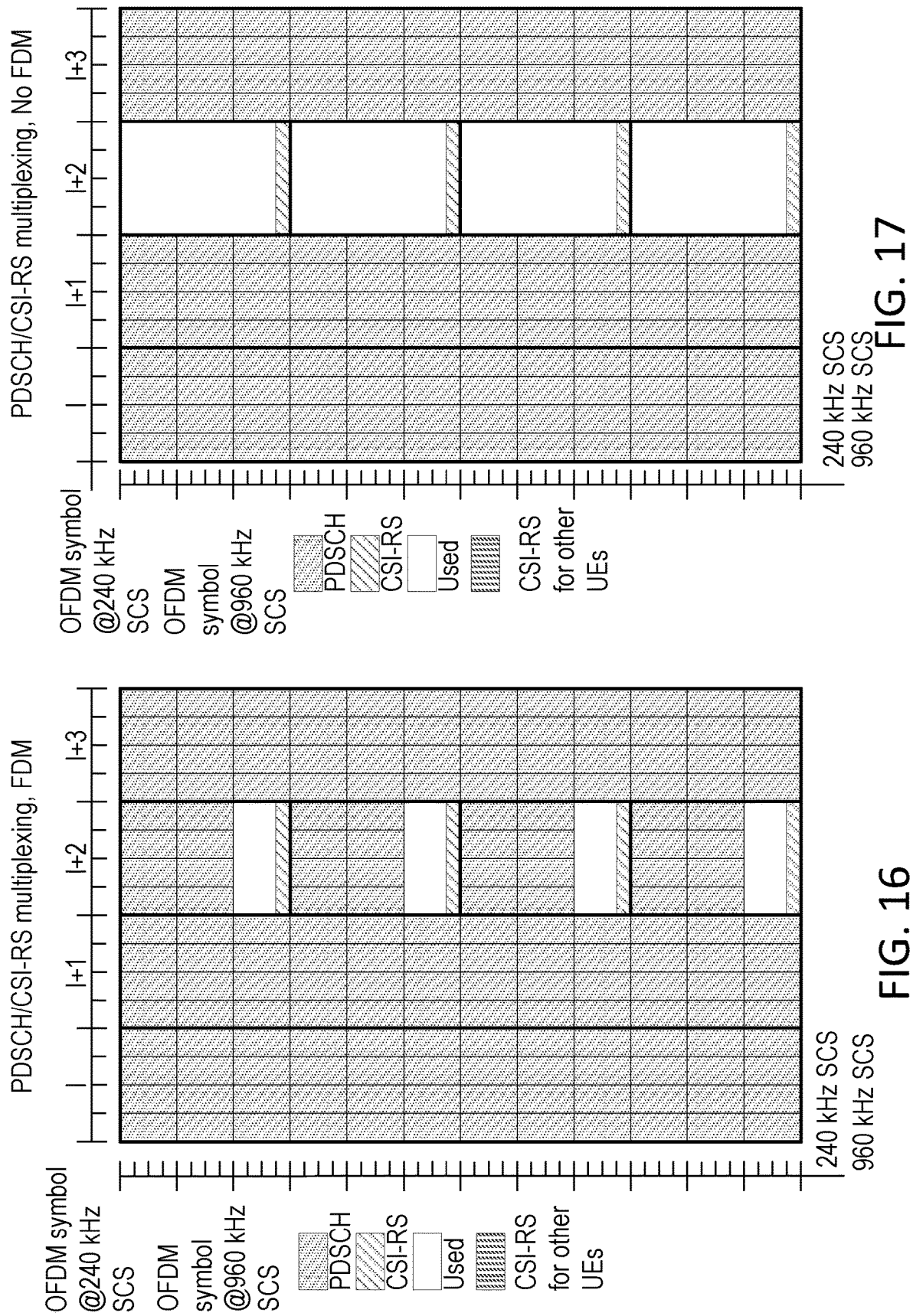
FIG. 16 is a diagram of PDSCH and CSI-RS multiplexing with mixed SCS.
FIG. 17 is another diagram of PDSCH and CSI-RS multiplexing with mixed SCS.
Figure 18:
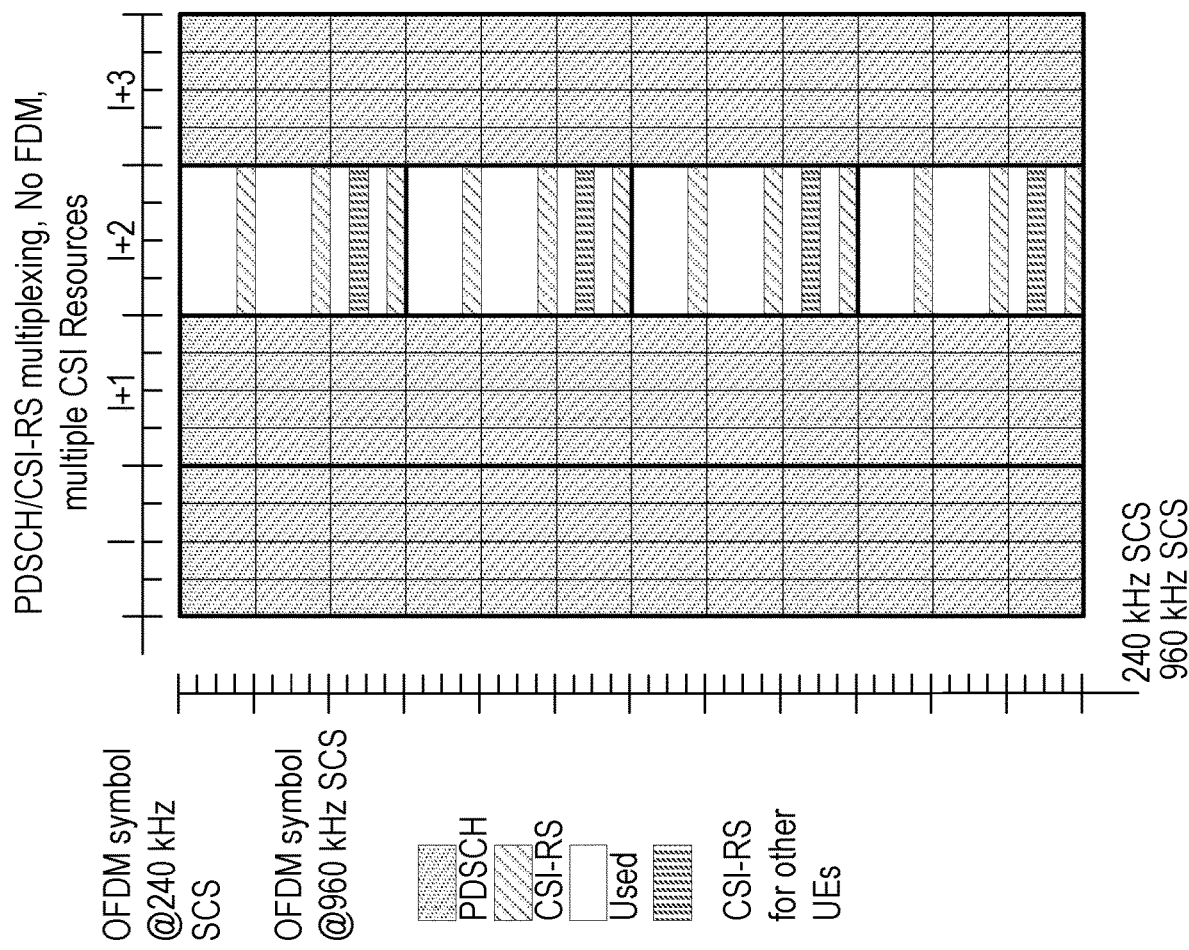
FIG. 18 is another diagram of PDSCH and CSI-RS multiplexing with mixed SCS.

Frequency domain multiplexing of PDSCH and CSI-RS with mixed subcarrier spacings in the same OFDM symbol may or may not be allowed. When FDM is allowed, the multiplexing may need to be performed on the basis of the larger subcarrier spacing in the frequency domain and basic OFDM symbol duration in the time domain. FIGS. 16-18 illustrates three examples of PDSCH multiplexing with CSI-RS with different subcarrier spacing. The CSI-RS is transmitted with the basic subcarrier spacing, i.e., 240 kHz in the example, while PDSCH is configured with a larger subcarrier spacing of 960 kHz. In the first example in FIG. 16, PDSCH and CSI-RS are frequency division multiplexed (FDMed). Since the PDSCH and CSI-RS OFDM symbols are of different durations, some REs cannot be used by the PDSCH and left empty as illustrated in FIG. 16. In the second example illustrated in FIG. 17, the PDSCH and the CSI-RS are not FDMed, which simplifies the processing in both network node 16 and wireless device 22 at the cost of reduced resource utilization. In both cases, the network node 16 can allocate multiple CSI-RS resources, either to the same wireless device 22 or to some other wireless devices 22 in the cell, in the same OFDM symbols, which is demonstrated by the third example in FIG. 18.

Figure 19:
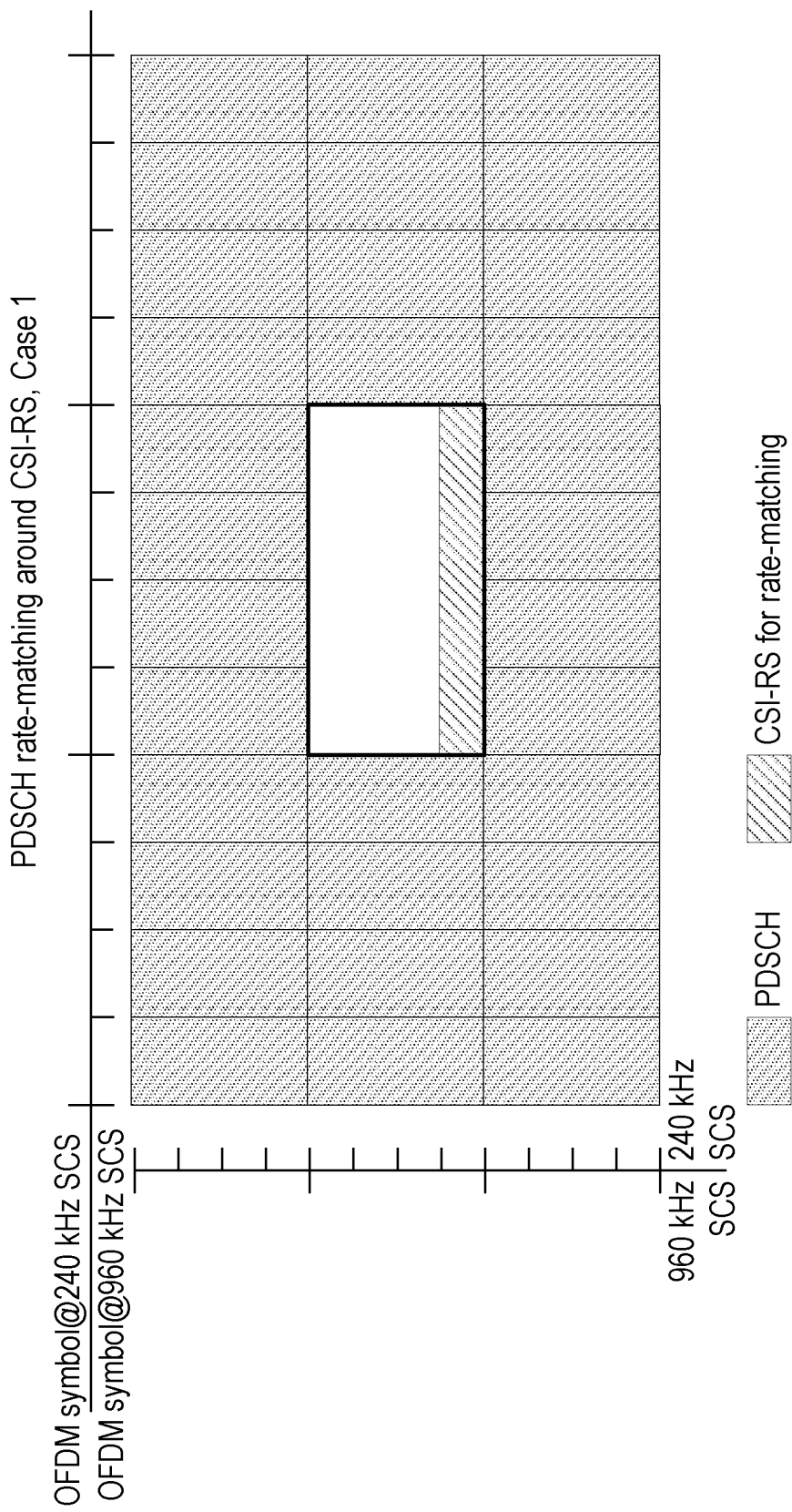
FIG. 19 is a diagram of PDSCH rate-matching around CSI-RS with different SCS.

In case of mixed subcarrier spacings, PDSCH rate-matching around CSI-RS can be performed on the REs that fall into the area defined by the basic OFDM symbol duration and the largest subcarrier spacing supported in the cell that contains CSI-RS to rate match around. FIG. 19-20 illustrates two different cases for PDSCH rate-matching around CSI-RS with different subcarrier spacing. In Case 1 (FIG. 19), PDSCH with 960 kHz subcarrier spacing rate-matches around CSI-RS transmitted with the basic subcarrier spacing of 240 kHz, while in Case 2 (FIG. 20), PDSCH and CSI-RS subcarrier spacings are arranged conversely.

Embodiment 6: SCS for SRS

NR may not support frequency multiplexing of PUSCH and SRS in the uplink. However, in case the SRS is configured with the same subcarrier spacing as PUSCH for wireless devices 22, which potentially can be different from the basic subcarrier spacing, and mixed subcarrier spacings are used among multiple wireless devices 22 in a cell, multiplexing of SRSs with different subcarrier spacings from different wireless devices 22 may need to be properly designed as are described below.

In one or more embodiments, SRS with different subcarrier spacing than the basic subcarrier spacing is not allowed, i.e., all SRSs in a cell are configured with the same basic subcarrier spacing. Hence, the legacy SRS resource mapping and multiplexing scheme in NR Rel-15 can be reused.

In one or more embodiments, only SRSs with the same subcarrier spacing are allowed to be frequency-multiplexed in a OFDM symbol. The network node 16 may configure SRSs with different subcarrier spacings for different wireless devices in the cell, create multiple groups of SRSs based on the subcarrier spacings, and map different SRS groups onto different OFDM symbols, so that SRSs mapped on the same OFDM symbol are always with the same subcarrier spacing.

In one or more embodiments, SRSs with different subcarrier spacings are multiplexed in the one OFDM symbol in different frequency segments of the carrier.

Figure 22:
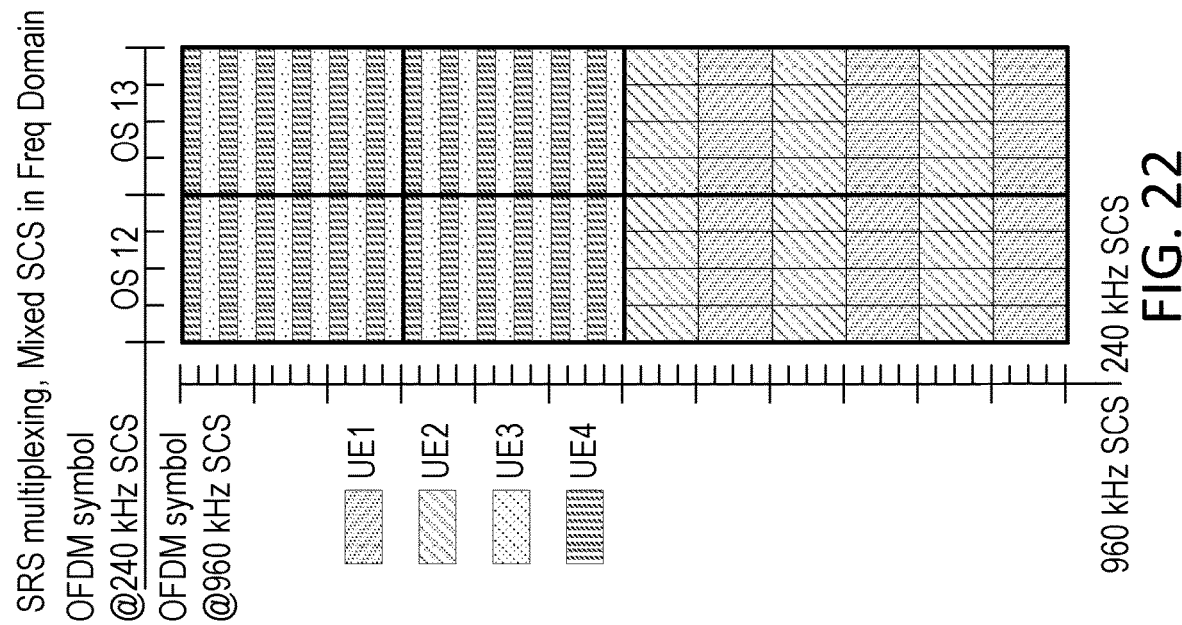
FIG. 22 is a diagram of SRS multiplexing with mixed subcarrier spacing.
Figure 21:
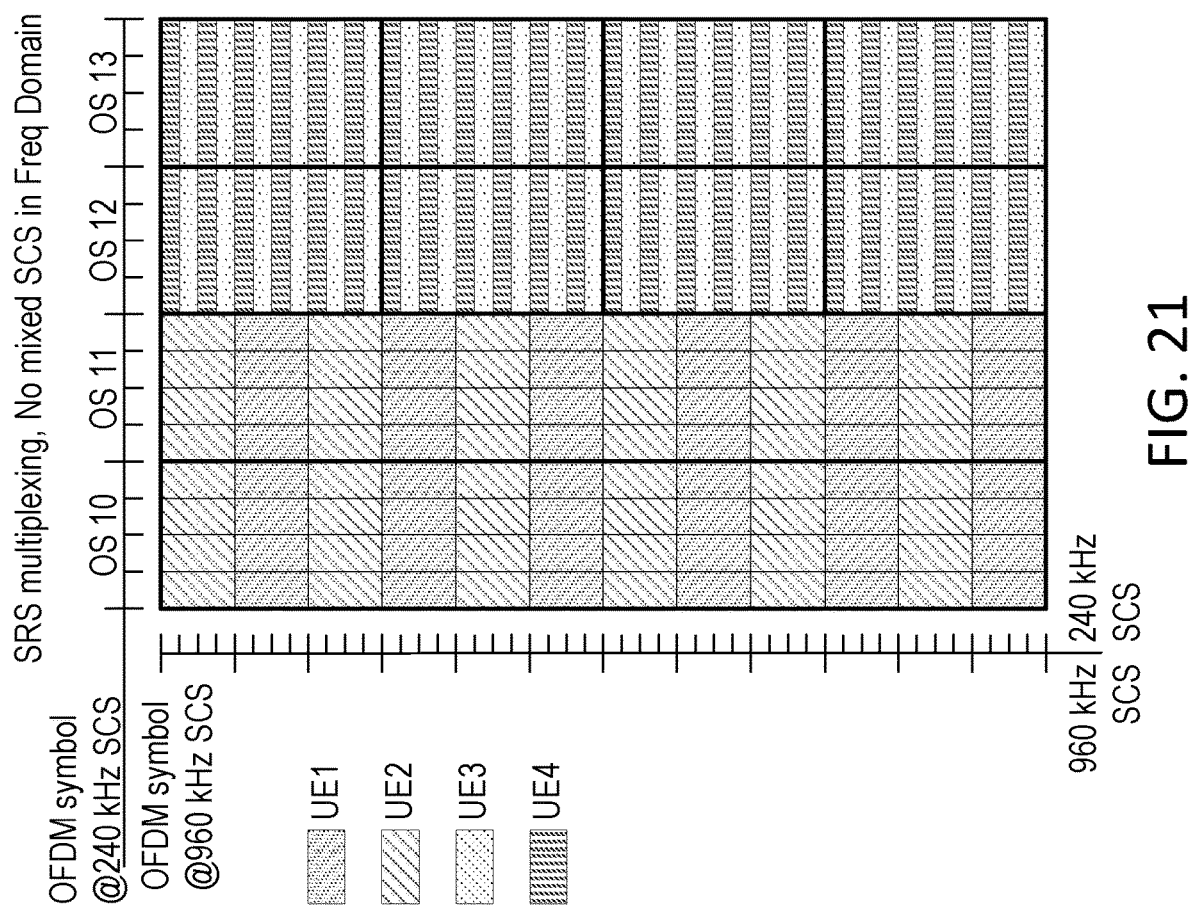
FIG. 21 is a diagram of SRS multiplexing with mixed subcarrier spacing.

FIGS. 21-22 illustrates two examples of SRS multiplexing among multiple wireless devices with mixed subcarrier spacings. In the first example shown in FIG. 21, SRSs with 960 kHz subcarrier spacing for UE1 and UE2 are frequency-multiplexed in OFDM symbol 10 and 11, while SRSs with 240 kHz subcarrier spacing for UE3 and UE4 are frequency-multiplexed in OFDM symbol 12 and 13. In the second example illustrated in FIG. 22, SRSs with different subcarrier spacings are multiplexed in different frequency segments in OFDM symbol 12 and 13. Comb2 frequency configuration may be used for all wireless devices 22 (i.e., UEs) in both examples where the comb2 frequency configuration is known the art.

In one or more embodiments, different types of SRS can be configured such as by network node 16 with different subcarrier spacings. In existing wireless communication standards such as in existing NR specification, there are different kinds of SRS: SRS for codebook/non-codebook based precoding, SRS for beam management, and SRS for DL CSI acquisition. In one non-limiting example, for beam management SRS, the basic SCS can be configured since it may not be necessary to reach the full bandwidth, and only power measurement may be used for beam selection purposes. For SRS for DL CSI acquisition, the same SCS as for PDSCH can be configured so the full bandwidth for PDSCH is sounded/transmitted to enable accurate CSI acquisition, e.g., for reciprocity based DL beamforming.

Embodiment 7: BWP Definition and PRB Indexing

For a BWP that supports PDSCH/PUSCH configured with different subcarrier spacing than the basic subcarrier spacing, the BWP definition and the PRB indexing within the BWP may need to be clarified and/or defined as described below.

In one or more embodiments, the BWP start position $RB_{start}$ and the size $L_{RB}$ are defined based on the basic subcarrier spacing of the BWP. To address large channel bandwidth with relatively small subcarrier spacing, the maximum FFT size and the maximum number of RBs might need to be extended. For example, with 240 kHz subcarrier spacing, the maximum FFT size and the maximum number of RBs need to be increased from 4096 and 275, as for NR Rel-15, to 8192 and 680 RBs respectively, the bit-widths for configuration fields relevant for frequency domain resource allocation might also need to be extended.

Multiple frequency-overlapping PRB grids with different subcarrier spacings are defined within the BWP. The frequency resource allocation can be based at least in part on the basic subcarrier spacing. RB allocation for PDSCH/PUSCH with larger subcarrier spacings can be derived from the corresponding frequency range in their respective RB grids. Alternatively, the PDSCH/PUSCH frequency resource allocation can also be performed based at least in part on the PDSCH/PUSCH specific subcarrier spacing. An example of RB grid in a BWP based on the basic subcarrier spacing is illustrated in in FIG. 23.

Figures 23, 24:
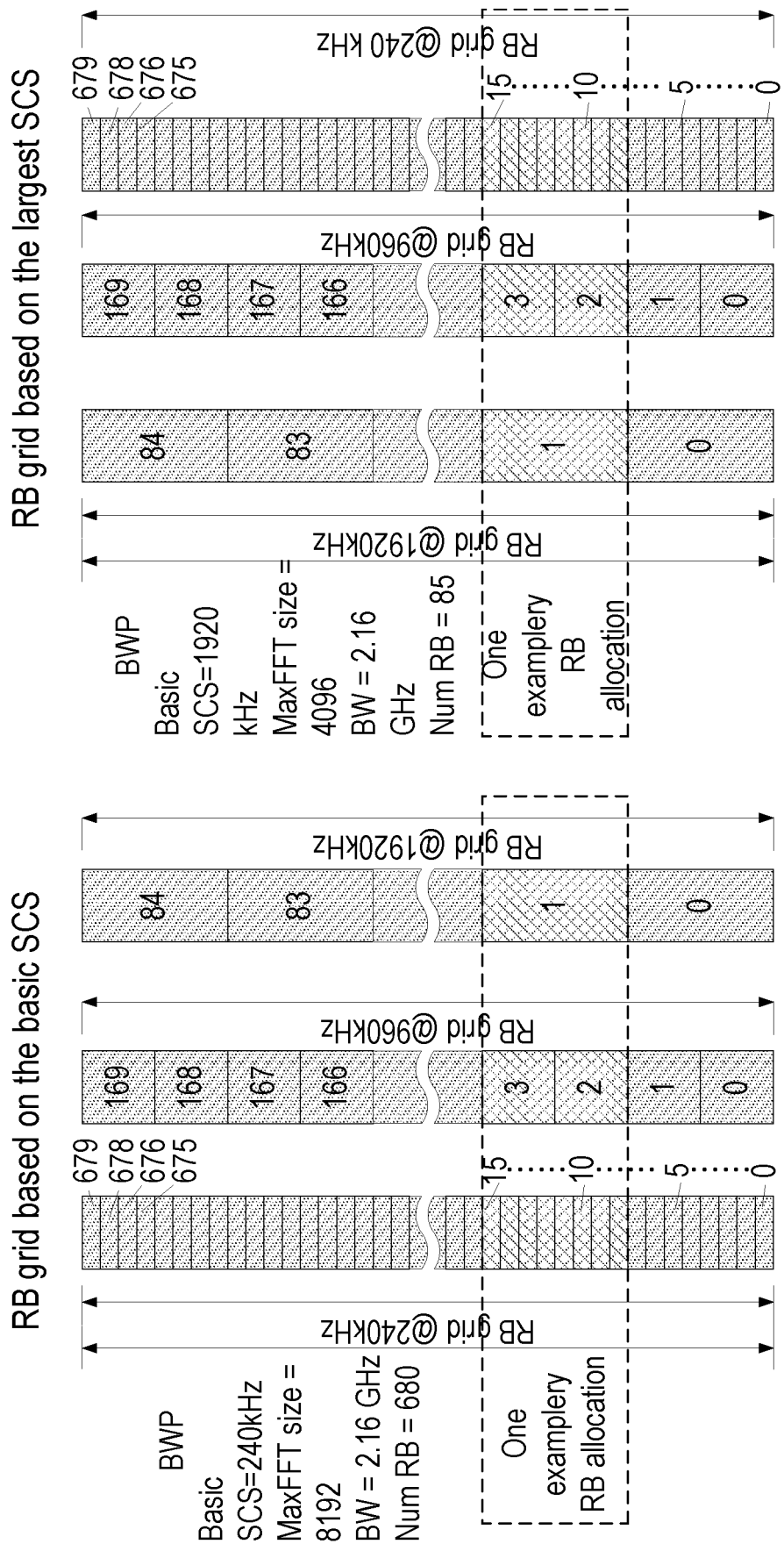
FIG. 23 is a diagram of a BWP RB grid based on the basic SCS or largest SCS.
FIG. 24 is a diagram of a BWP RB grid based on the basic SCS or largest SCS.

In another variant of the embodiment, the BWP start position $RB_{start}$ and the size $L_{RB}$ are defined based on the largest subcarrier spacing configured in the BWP, as shown in FIG. 24. Given the BWP bandwidth defined using the largest subcarrier spacing configured in the BWP, such as 1920 kHz as in FIG. 24, the current FFT size and RB allocation constraints in NR Rel-15 may be sufficient to address a much larger carrier bandwidth. In particular, with maximum 275 RBs at 1920 kHz subcarrier spacing, the addressable carrier bandwidth can be as high as 6.336 GHz. However, when indexing RB with small subcarrier spacing, the range for the RB index might need to be increased.

Multiple frequency-overlapping PRB grids with different subcarrier spacings are defined within the BWP. The frequency resource allocation is based on the largest subcarrier spacing and the granularity is limited to one RB with the largest subcarrier spacing. RB allocation for smaller subcarrier spacings can be derived from the corresponding frequency range in their respective RB grids. Alternatively, the frequency resource allocation for smaller subcarrier spacings can be performed based on their respective subcarrier spacings directly. An example for RB grid in a BWP based on the largest subcarrier spacing is demonstrated in FIG. 24.

Examples

Example A1. A network node 16 configured to communicate with a wireless device 22 (WD 22), the network node 16 configured to, and/or comprising a radio interface 62 and/or comprising processing circuitry 68 configured to:

configure a plurality of physical channels within a bandwidth part, BWP, with a plurality of numerologies; and optionally cause transmission of the physical channels within the BWP according to the plurality of numerologies.

Example A2. The network node 16 of Example A1, wherein each numerology includes a respective subcarrier spacing; and the physical channels within the BWP corresponding to at least one control channel and at least one data channel.

Example A3. The network node 16 of Example A1, wherein the at least one control channel includes at least one of a physical downlink control channel and physical uplink control channel; and the at least one data channel includes at least one of a physical downlink shared channel and physical uplink shared channel.

Example A4. The network node 16 of Examples A2-A3, wherein the subcarrier spacing is based at least in part on at least one of a predefined basic subcarrier spacing and a subcarrier spacing expansion factor relative to the predefined basic subcarrier spacing.

Example A5. The network node 16 of any one of Examples A2-A4, wherein the subcarrier spacing is applied to at least one of a corresponding demodulation reference signal, DMRS, and a sounding reference signal, SRS.

Example B1. A method implemented in a network node 16, the method comprising:

configuring a plurality of physical channels within a bandwidth part, BWP, with a plurality of numerologies; and optionally causing transmission of the physical channels within the BWP according to the plurality of numerologies.

Example B2. The method of Example B1, wherein each numerology includes a respective subcarrier spacing; and the physical channels within the BWP corresponding to at least one control channel and at least one data channel.

Example B3. The method of Example B1, wherein the at least one control channel includes at least one of a physical downlink control channel and physical uplink control channel; and the at least one data channel includes at least one of a physical downlink shared channel and physical uplink shared channel.

Example B4. The method of any one of Examples B2-B3, wherein the subcarrier spacing is based at least in part on at least one of a predefined basic subcarrier spacing and a subcarrier spacing expansion factor relative to the predefined basic subcarrier spacing.

Example B5. The method of any one of Examples B2-B4, wherein the subcarrier spacing is applied to at least one of a corresponding demodulation reference signal, DMRS, and a sounding reference signal, SRS.

Example C1. A wireless device 22 (WD 22) configured to communicate with a network node 16, the WD 22 configured to, and/or comprising a radio interface 62 and/or processing circuitry 68 configured to:

receive a plurality of physical channels within a bandwidth part, BWP, with a plurality of numerologies.

Example C2. The WD 22 of Example C1, wherein each numerology includes a respective subcarrier spacing; and the physical channels within the BWP corresponding to at least one control channel and at least one data channel.

Example C3. The WD 22 of Example C1, wherein the at least one control channel includes at least one of a physical downlink control channel and physical uplink control channel; and the at least one data channel includes at least one of a physical downlink shared channel and physical uplink shared channel.

Example C4. The wireless device 22 of Examples C2-C3, wherein the subcarrier spacing is based at least in part on at least one of a predefined basic subcarrier spacing and a subcarrier spacing expansion factor relative to the predefined basic subcarrier spacing.

Example C5. The wireless device 22 of any one of Examples C2-C4, wherein the subcarrier spacing is applied to at least one of a corresponding demodulation reference signal, DMRS, and a sounding reference signal, SRS.

Example D1. A method implemented by a wireless device 22 (WD 22) that is configured to communicate with a network node 16, the method comprising:

receiving a plurality of physical channels within a bandwidth part, BWP, with a plurality of numerologies.

Example D2. The method of Example D1, wherein each numerology includes a respective subcarrier spacing; and the physical channels within the BWP corresponding to at least one control channel and at least one data channel.

Example D3. The method of Example D1, wherein the at least one control channel includes at least one of a physical downlink control channel and physical uplink control channel; and the at least one data channel includes at least one of a physical downlink shared channel and physical uplink shared channel.

Example D4. The method of Examples D2-D3, wherein the subcarrier spacing is based at least in part on at least one of a predefined basic subcarrier spacing and a subcarrier spacing expansion factor relative to the predefined basic subcarrier spacing.

Example D5. The method of any one of Examples D2-D4, wherein the subcarrier spacing is applied to at least one of a corresponding demodulation reference signal, DMRS, and a sounding reference signal, SRS.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that May be Used in the Preceding Description Include

DCI Downlink Control Information
DFT Discrete Fourier Transform
FDM Frequency Division Multiplexing
LTE Long Term Evolution
NR New Radio
OFDM Orthogonal Frequency Division Multiplexing
OS OFDM Symbol
PA Power Amplifier
PDCCH Physical Downlink Control Channel
PDSCH Physical Downlink Shared Channel
PRB Physical Resource Block
PUCCH Physical Uplink Control Channel
PUSCH Physical Uplink Shared Channel
RAN Radio Access Network
RB Resource Block
SCS Sub-Carrier Spacing
SSB Synchronous Signal and PBCH It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A network node configured to communicate with a wireless device, the network node comprising:
    processing circuitry configured to:
        dynamically indicate a mixed numerology to the wireless device for implementation, the mixed numerology corresponding to a first numerology for a data channel and a second numerology for a control channel, the first numerology being different from the second numerology;
        indicate a preconfigured subcarrier spacing for a bandwidth part, BWP, in a carrier, the dynamically indicated mixed numerology configured to change a subcarrier spacing for the data channel from the preconfigured subcarrier spacing to a first subcarrier spacing associated with the first numerology; and
        add at least one demodulation reference signal, DMRS, symbol to the data channel to densify a DMRS allocation that is based on the preconfigured subcarrier spacing.

2. The network node of claim 1, wherein the additional at least one DMRS symbol is distributed throughout the data channel in a time domain.

3. The network node of claim 1, wherein the additional at least one DMRS symbol is front-loaded next to another DMRS symbol of the DMRS allocation.

4. The network node of claim 1, wherein the data channel and control channel are allocated within a bandwidth part, BWP, that is defined by a plurality of subcarrier spacings, the plurality of subcarrier spacing including a first subcarrier spacing associated with the first numerology and a second subcarrier spacing associated with the second numerology.

5. The network node of claim 4, wherein the plurality of subcarrier spacings are based on a preconfigured subcarrier spacing for the BWP.

6. The network node of claim 5, wherein a resource block start position and a size of the BWP are based at least in part on the preconfigured subcarrier spacing.

7. The network node of claim 4, wherein the plurality of subcarrier spacings are based on a largest subcarrier spacing of the plurality of subcarrier spacings.

8. The network node of claim 7, wherein a resource block start position and a size of the BWP are based at least in part on the largest subcarrier spacing of the plurality of subcarrier spacings.

9. The network node of claim 1, wherein the first numerology for the data channel is associated with a larger subcarrier spacing than a subcarrier spacing associated with the second numerology.

10. The network node of claim 9, wherein the subcarrier spacing associated with the second numerology corresponds to a subcarrier spacing preconfigured for a bandwidth part, BWP, in which the data channel and control channel are transmitted.

11. The network node of claim 1, wherein the processing circuitry is further configured to indicate the first numerology at least in part by signaling of an expansion factor, the expansion factor configured to change a subcarrier spacing from a preconfigured subcarrier spacing for a bandwidth part, BWP, to a first subcarrier spacing associated with the first numerology using the expansion factor.

12. The network node of claim 11, wherein the signaling corresponds to one of semi-static radio resource control, RRC, signaling, semi-persistent medium access control, MAC, control element, CE, signaling and downlink control information, DCI, signaling.

13. The network node of claim 12, wherein the DCI signaling includes a subcarrier spacing section field and a frequency domain resource allocation field that are jointly encoded as a bit field having a predefined bit size.

14. The network node of claim 13, wherein a subset of most significant bits in the bit field are configured to indicate the first subcarrier spacing.

15. The network node of claim 1, wherein the processing circuitry is further configured to rate match the data channel to a channel state information reference signal, CSI-RS, associated with a different subcarrier spacing than the first subcarrier spacing.

16. The network node of claim 1, wherein the processing circuitry is further configured to multiplex a plurality of sounding reference signals, SRSs, received from a plurality of wireless devices, the plurality of SRSs being associated with a plurality of subcarrier spacings including at least a first subcarrier spacing associated with the first numerology.

17. A wireless device configured to communicate with a network node, the wireless device comprising:
processing circuitry configured to:
receive a dynamic indication of a mixed numerology, the mixed numerology corresponding to a first numerology for a data channel and a second numerology for a control channel, the first numerology being different from the second numerology; and
cause implementation of the mixed numerology;
receive an indication for a preconfigured subcarrier spacing for a bandwidth part, BWP, in carrier, the dynamically indicated mixed numerology configured to change a subcarrier spacing for the data channel from the preconfigured subcarrier spacing to a first subcarrier spacing associated with the first numerology; and
the data channel includes at least one added demodulation reference signal, DMRS, symbol for densifying a DMRS allocation that is based on the preconfigured subcarrier spacing.

18. A method implemented by a network node that is configured to communicate with a wireless device, the method comprising:
dynamically indicating a mixed numerology to the wireless device for implementation, the mixed numerology corresponding to a first numerology for a data channel and a second numerology for a control channel, the first numerology being different from the second numerology;
indicating a preconfigured subcarrier spacing for a bandwidth part, BWP, in a carrier, the dynamically indicated mixed numerology configured to change a subcarrier spacing for the data channel from the preconfigured subcarrier spacing to a first subcarrier spacing associated with the first numerology; and
adding at least one demodulation reference signal, DMRS, symbol to the data channel to densify a DMRS allocation that is based on the preconfigured subcarrier spacing.

19. A method implemented by a wireless device configured to communicate with a network node, the method comprising:
receiving a dynamic indication of a mixed numerology, the mixed numerology corresponding to a first numerology for a data channel and a second numerology for a control channel, the first numerology being different from the second numerology;
causing implementation of the mixed numerology;
receiving an indication for a preconfigured subcarrier spacing for a bandwidth part, BWP, in carrier, the dynamically indicated mixed numerology configured to change a subcarrier spacing for the data channel from the preconfigured subcarrier spacing to a first subcarrier spacing associated with the first numerology; and
the data channel including at least one added demodulation reference signal, DMRS, symbol for densifying a DMRS allocation that is based on the preconfigured subcarrier spacing.

* * * * *